United States Patent
Starsinic et al.

(10) Patent No.: US 10,757,636 B2
(45) Date of Patent: Aug. 25, 2020

(54) NOTIFICATION AND TRIGGER FOR SERVICE LAYERS AND APPLICATIONS IN A SMALL CELL NETWORK

(71) Applicant: Convida Wireless, LLC, Wilmington, DE (US)

(72) Inventors: Michael F. Starsinic, Newtown, PA (US); Ahmed Mohamed, Pembroke Pines, FL (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 15/748,838

(22) PCT Filed: Jul. 29, 2016

(86) PCT No.: PCT/US2016/044701
§ 371 (c)(1),
(2) Date: Jan. 30, 2018

(87) PCT Pub. No.: WO2017/023748
PCT Pub. Date: Feb. 9, 2017

(65) Prior Publication Data
US 2018/0227837 A1 Aug. 9, 2018

Related U.S. Application Data

(60) Provisional application No. 62/199,559, filed on Jul. 31, 2015.

(51) Int. Cl.
*H04W 48/16* (2009.01)
*H04W 4/70* (2018.01)
(Continued)

(52) U.S. Cl.
CPC .............. *H04W 48/16* (2013.01); *H04W 4/60* (2018.02); *H04W 4/70* (2018.02); *H04W 12/08* (2013.01);
(Continued)

(58) Field of Classification Search
CPC ....... H04W 48/16; H04W 60/04; H04W 4/70; H04W 4/60; H04W 12/08; H04W 76/14; H04W 60/00
See application file for complete search history.

(56) References Cited

U.S. PATENT DOCUMENTS

2013/0262576 A1  10/2013  Foti
2013/0279372 A1* 10/2013  Jain .......................... H04W 4/70
                                                                  370/254
(Continued)

FOREIGN PATENT DOCUMENTS

GB        2507301 A      4/2014
WO   2015/040280 A1      3/2015

OTHER PUBLICATIONS

3GPP TR23.708 V13.0.0, "3rd Generation Partnership Project; Technical Specification Group Services and Systems Aspects; Architecture Enhancements for Service Capability Exposure" Jun. 2015, 31 pages.

(Continued)

*Primary Examiner* — Steven H Nguyen
(74) *Attorney, Agent, or Firm* — BakerHostetler

(57) ABSTRACT

In current approaches to M2M architectures, no interworking application programming interfaces (API's) are exposed to the service layers that are in the local network. Thus, a service layer might not able to make various requests including, for example, that devices be triggered, that the service layer receive notifications when devices are connected to the network, and that the service layer receive (Continued)

notifications when devices are no longer connected to the network. Described herein is a small cell architecture that provides an interworking interface to applications and service layers that reside in the local small cell network. For example, a small cell or eNB may send a notification, for example to a Local Security Capability Exposure Function (L-SCEF) or a core network function, when a UE attaches to or disconnects from a local network.

11 Claims, 26 Drawing Sheets

(51) Int. Cl.
<br>    *H04W 4/60*         (2018.01)
<br>    *H04W 12/08*       (2009.01)
<br>    *H04W 60/04*       (2009.01)
<br>    *H04W 60/00*       (2009.01)
<br>    *H04W 76/14*       (2018.01)

(52) U.S. Cl.
<br>    CPC ............ *H04W 60/04* (2013.01); *H04W 60/00* (2013.01); *H04W 76/14* (2018.02)

(56) References Cited

U.S. PATENT DOCUMENTS

| | | | |
|---|---|---|---|
| 2013/0310027 A1* | 11/2013 | Foti .................. | H04W 8/02 455/432.1 |
| 2014/0086143 A1 | 3/2014 | Foti et al. | |
| 2014/0086144 A1* | 3/2014 | Foti .................. | H04L 61/106 370/328 |
| 2014/0089442 A1* | 3/2014 | Kim .................. | H04L 51/38 709/206 |
| 2014/0219182 A1* | 8/2014 | Chandramouli ...... | H04W 60/00 370/328 |
| 2015/0029939 A1 | 1/2015 | Fujinami et al. | |
| 2015/0139086 A1* | 5/2015 | Murakami .......... | H04W 8/26 370/329 |
| 2015/0304982 A1* | 10/2015 | Liao ................ | H04W 64/00 455/456.2 |
| 2015/0341889 A1* | 11/2015 | Starsinic .......... | H04W 60/06 370/329 |
| 2017/0215062 A1* | 7/2017 | Xu ................... | H04W 8/08 |
| 2017/0295527 A1* | 10/2017 | Ali ................... | H04W 36/08 |
| 2018/0242195 A1* | 8/2018 | Dai .................. | H04W 28/08 |
| 2019/0274174 A1* | 9/2019 | Watfa ............... | H04W 76/10 |

OTHER PUBLICATIONS

3GPP TS 23.401 V12.9.0 "3rd Generation Partnership Project; Technical Specification Group Services and System Aspects; General Packet Radio Services (DPRS) Enhancements for Evolved Universal Terrestrial Radio Access Network (E-UTRAN) Access" Jun. 2015, 309 pages.

3GPP TS 24.301 V12.6.0, "3rd Generation Partnership Project; Technical Specification Group Core Network and Terminals; Non-Access-Stratum (NAS) Protocol for Evolved Packet System (EPS) Stage 3", Sep. 2014, 370 pages.

3GPP TS 36.413 V12.3.0, "3rd Generation Partnership Project; Technical Specification Group Radio Access Network; Evolved Universal Terrestrial Radio Access network (E-UTRAN); S1 Application Protocol (S1AP) (Release 12)" Sep. 2014, 290 pages.

3GPP TS23.003 V12.4.1, "3rd Generation Partnership Project; Technical Specification Group Core Network and Terminals; Numbering, addressing and Identification" Oct. 2014, 90 pages.

3GPP TS23.682 V13.2.0, "3rd Generation Partnership Project; Technical Specification Group Services and System Aspects; Architecture Enhancements to Facilitate Communications with Packet Data Networks and Applications" Jun. 2015, 70 pages.

3GPP TSG SA WG2 HTC Meeting #89 TD S2-120718, "Clarification Proposal for Device Triggering Flow" Vancouver, Canada, Feb. 2012, 6 pages.

3GPP TSG SA WG2 Meeting #84, TD S2-111370, ZTE, "Device Trigger Solution via PCRF" Apr. 2011, 4 pages.

Broadband Forum Technical Report TR-069, "CPE WAN Management Protocol, Issue: 1 Amendment 4", Jul. 2011, 190 pages.

Narten et al., "Neighbor Discovery for IP Version 6 (IPv6)" Network Working Group, RFC: 4861 Standards Track, Sep. 2007, 97 pages.

oneM2M Technical Specification TS-0001-V1.6.1, "Functional Architecture" Jan. 30, 2015, 321 pages.

oneM2M Technical Specification TS-0007 V0.3.0, Service Component Architecture, Jun. 17, 2014, 105 pages.

* cited by examiner

NOTIFICATION AND TRIGGER FOR SERVICE LAYERS AND APPLICATIONS IN A SMALL CELL NETWORK

CROSS REFERENCE TO RELATED APPLICATIONS

This Application is a National Stage Application filed under 35 U.S.C. § 371 of International Application No. PCT/US2016/044701 filed Jul. 29, 2016, which claims the benefit of U.S. Provisional Patent Application Ser. No. 62/199,559, filed Jul. 31, 2015, the disclosure of which is hereby incorporated by reference as if set forth in its entirety herein.

BACKGROUND

Referring initially to FIG. 1, an example Service Capability Exposure Function (SCEF) 102 is depicted. The Service Capability Exposure Function (SCEF) is a new function that is being discussed within 3GPP SA2. The SCEF is currently defined in the 3GPP Technical Report (TR) 23.708, "Architecture Enhancements for Service Exposure," which is incorporated by reference as if the contents of which are set forth herein. As stated in 3GPP TR 23.708, with respect to the SCEF, "The exposure of services by the network creates a 'toolbox' of capabilities that, with proper authorization, can be used, for example, to retrieve information, to request specific services, to receive notifications, to request the setting of specific parameters, etc."

As further described in 3GPP TR 23.708, the SCEF is part of the "trust domain" in the sense that the core network will consider it a trusted entity with a secure connection to the core network. The SCEF, however, may be owned by a third party. The design of the interface between the SCEF and the core network should take ownership of the SCEF into account. For example, it might not be desirable to expose information, such as International Mobile Subscriber Identities (IMSI's), on this interface. As shown in FIG. 1, applications 104 can access application programming interfaces (API's). In accordance with the example, a service layer, a common services entity (CSE), and a service capability server (SCS) can be represented by one of the applications 104.

Referring now to FIG. 2, an example architecture for a local IP access (LIPA) or a Selected IP Traffic Offload (SIPTO) is shown. FIG. 2 is reproduced from 3GPP Technical Specification (TS) 23.401, "General Packet Radio Service (GPRS) enhancements for Evolved Universal Terrestrial Radio Access Network (E-UTRAN) access," which is incorporated by reference as if its contents are set forth herein. With respect to embodiments described herein, the HeNB 202 shown in FIG. 2 may also represent an eNB or small cell, which may be referred to collectively as a eNB/small cell. The L-GW 204 may be associated with a single eNB/Small Cell or it may be deployed in a Small Cell Network and connected to multiple eNB's/Small Cells. As shown, the L-GW 204 appears like a combined Serving Gateway (S-GW)/Packet Data Network (PDN) Gateway (P-GW) to the UE 206. The L-GW 204 is an IP data network anchor, which may be referred to generally as a local network anchor. The UE 206 may request to establish an LIPA PDN connection with the L-GW instead of a regular PDN connection with the S-GW/P-GW. The L-GW is deployed in the Local IP Network, which is geographically associated with the eNB/Small Cell Location. Thus, local IP traffic associated with the UE 206 can be routed more directly to/from the local services that it wishes to access. This may be an efficient alternative to routing the data through the core network and back into the local network. Similar to the P-GW, the L-GW 204 may provide various functions such as, for example, UE IP Address Allocation, DHCPv4 (server and client) and DHCPv6 (client and server) functions, Packet Screening and Neighbor Discovery for IPv6 Functionality that is defined in RFC 4861, Neighbor Discovery for IP version 6 (IPv6). Additionally, the L-GW 204 may support Evolved Packet System (EPS) Connection Management (ECM)-IDLE mode downlink packet buffering and ECM-Connected mode direct tunneling towards the HeNB 202.

Turning now to Selected IP Traffic Offload (SIPTO), SIPTO is described in Section 4.3.15a.1 of 3GPP TS 23.401. SIPTO generally refers to the case in which IP traffic is routed to an IP network without it traversing the mobile operator's network. For example, this may be achieved when the UE 206 establishes a PDN connection with the L-GW 204 that is colocated with the (H)eNB 202/Small Cell or a standalone L-GW function. With respect to SIPTO at the Local Network with a stand-alone GW (e.g., with S-GW and L-GW colocated) function, this type of SIPTO is described in section 4.3.15a.2 of 3GPP TS 23.401. In this type of L-GW deployment, the L-GW 204 is a standalone function and may serve multiple eNBs/Small Cells. A Local Home Network ID is associated with the L-GW 204. The eNB/Small Cells inform the Mobile Management Entity (MME) 208 that the L-GW 204 is accessible, and identify the L-GW 204 with the Local Home Network ID.

With respect to SIPTO at the Local Network with the L-GW 204 colocated with the (H)eNB 202, this type of SIPTO is described in section 4.3.15a.3 of reference 3GPP TS 23.401. In this type of L-GW deployment, the L-GW 204 is collocated with the (H)eNB 202. A Local gateway (GW) Address is associated with the L-GW 204. The eNB/Small Cells inform the MME 208 that the L-GW 204 is accessible, and identify the L-GW 204 with the Local GW Address.

Turning now to device triggering, a use case is considered in which an Application Server (AS) wants to communicate with a device application or a device service layer, but the device has no IP address or the Application Server does not know the device's IP address. Examples of Application Servers include, without limitation, a Service Layer, a SCS, an Infrastructure Node (IN)-CSE, or a Middle Node (MN)-CSE. A device trigger refers to a message that is initiated by an Application Server and sent to a device, usually over the control plane. Because it is sent over the control plane, an IP address is not needed to address the device. The trigger is sent to an external 3GPP identifier, such as an MSISDN or a URI for example. Device triggers can be used to send small amounts of application or device service layer data from an Application Server to a UE. A small amount of data can be sent to an application when no response is expected. For example, an Application Server can use a device trigger to instruct a sensor to turn on. If the Application Server expects no response, then no IP connection would be required. Device triggers can also be used to instruct a device application, or service layer, to initiate communications with the Application Server. In some cases, if an Application Server wishes to address a Machine Type Communication (MTC) device application that does not have an IP address, a device trigger is required.

A trigger may be delivered to an MTC device application that already has an IP address. For example, an Application Server may wish to establish a connection with an MTC device application, but the Application Server might not know the device's IP address or the Application Server might be unsure of whether the MTC device has an IP address.

With respect to X2 handover, in E-UTRAN, the eNB's can perform direct handover via the direct interface (known as X2 interface) between eNodeBs. In the X2-based handover (HO) procedure, which is described in oneM2M TS-0001, the source eNodeB and the target eNodeB prepare and execute the HO procedure. At the end of the HO execution, the target eNodeB requests the MME to switch the downlink data path from the source eNodeB to the target eNodeB. The MME in turn requests the serving GW to switch the data path toward the new eNodeB.

With respect to S1 handover procedures, which are described in 3GPP TS 23.401, an S1-based HO procedure may be used when the X2 procedure cannot be used. For example, the S1 based HO procedure may be used when there is no X2 interface between the source and target eNodeB's, or when the target eNodeB requires that a different MME and/or S-GW be used. The S1 procedure may be initiated when the eNodeB sends a handover required message to the MME via the S1-MME reference point.

With respect to Non-Access Stratum (NAS) Signaling, NAS signaling between the UE and MME is described in 3GPP TS 24.301, "Non-Access Stratum (NAS) protocol for Evolved Packet System (EPS)"; Stage 3, which is incorporated by reference as if its contents are set forth herein. As described in 3GPP TS 24.301, the NAS signaling between the UE and MME traverses the eNodeB/Small Cell, but it is usually ciphered and always integrity protected so that it cannot be modified or altered by the eNodeB/Small Cell. As further described in 3GPP TS 24.301, the eNodeB/Small Cell may append information to an NAS message, but may not modify or inspect the message itself.

Referring now to FIG. 3, an example M2M service layer is shown. Service Layers are generally a type of message bus or middleware that defines how services interact with applications and other services. A given Service Layer protocol may bind to a set of transport layer protocol(s). The oneM2M Service Layer is organized as a set of common functions (or service capabilities), an instantiation of which is referred to as a Common Services Entity (CSE). The oneM2M Service Layer is further described in oneM2M TS-0001, "Functional Architecture," which is incorporated by reference as if its contents are set forth herein. The common functions are exposed via the Mca, Mcc and Mcn reference points as shown in FIGS. 3 and 4. FIG. 4 also depicts the Msc reference point. The Msc reference point specifies a set of interactions between the Service Capabilities of different Service Components. The realization of the interaction between the Services Capabilities is implementation specific, as described in oneM2M TS-0007, "Service Component Architecture," which is incorporated by reference as if its contents are set forth herein.

Referring also to FIG. 4, the Mca reference point designates communication flows between an Application Entity (AE) and a CSE, and the Mcc reference point designates communication flows between two CSEs in the same M2M Service Provider domain. Communications across Mca and Mcc take place via paired Request/Response messages, wherein each request performs a specific RESTful operation (e.g., Create, Retrieve, Update, and Delete) upon a resource hosted on the targeted CSE. The Mcc' reference point is used between CSEs located in the Infrastructure Domain of different M2M SPs. The Mcn reference point is used between a CSE and an underlying Network Services Entity (NSE) for services other than transport and connectivity.

CSEs are hosted on architectural entities referred to as "nodes". A node generally refers to a functional entity that contains a) one CSE and zero or more AEs, or b) one or more AEs. The oneM2M architecture makes no assumptions about the underlying platform and protocols that are used to pass messages on the Mcc, Mca, Mcc', and Mcn reference points. For example, the services that are provided by CSE's may vary from a temperature sensor service that is implemented on a low cost device to a billing system that is deployed on a large network server. Thus, the architecture is well suited for utilizing a messaging protocol.

In current approaches to M2M architectures, as described above, no interworking API's are exposed to the Service Layers that are in the local network. Thus, a service layer might not able to make various requests including, for example, that devices be triggered, that the service layer receive notifications when devices are connected to the network, and that the service layer receive notifications when devices are no longer connected to the network.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Described herein is a small cell architecture that provides an interworking interface to applications and service layers that reside in the local small cell network. In one embodiment, an apparatus, which may comprise a core network function, small cell, base station, eNodeB, NodeB, Home eNodeB, or Home NodeB for example, comprises a processor, a memory, and communication circuitry. The apparatus is connected to a local network via its communication circuitry. The apparatus further comprises computer-executable instructions stored in the memory of the apparatus which, when executed by the processor of the apparatus, cause the apparatus to receive a request that a node be notified when a user equipment (UE) connects to the local network. The node may be a Local Service Capability Exposure Function (L-SCEF), a core network function, Service Layer, an M2M Server, a Gateway, a Server, or a Local Gateway. The UE may also be capable of connecting to the local network via a local network anchor, for instance a local IP access connection. The apparatus may send a notification when the UE attaches to the local network. The apparatus may also send a notification when the UE disconnects from the local network. The apparatus may be authorized to send the notification by a mobility management entity (MME). Such authorization information may be received in an Initial Context Setup/Attach Accept message, a Tracking Area Update Accept Message, or a Path Switch Request Acknowledge message. Alternatively, the apparatus may be authorized to send the notification by an administrator associated with the local network, such as a core network function for example.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

DETAILED DESCRIPTION OF ILLUSTRATIVE EMBODIMENTS

Figure 1:
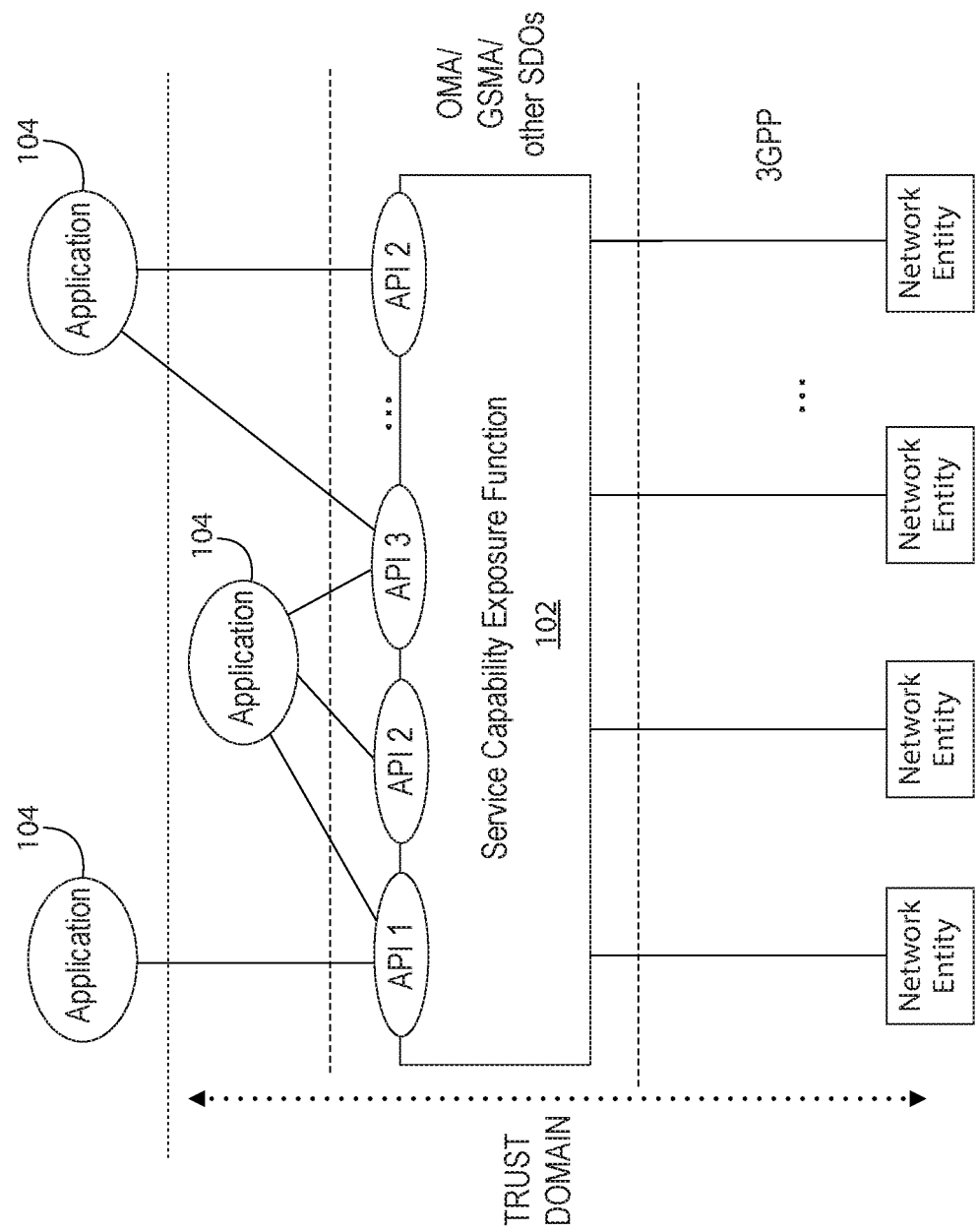
FIG. 1 is a block diagram that depicts an example Service Capability Exposure Function (SCEF) architecture.
Figure 2:
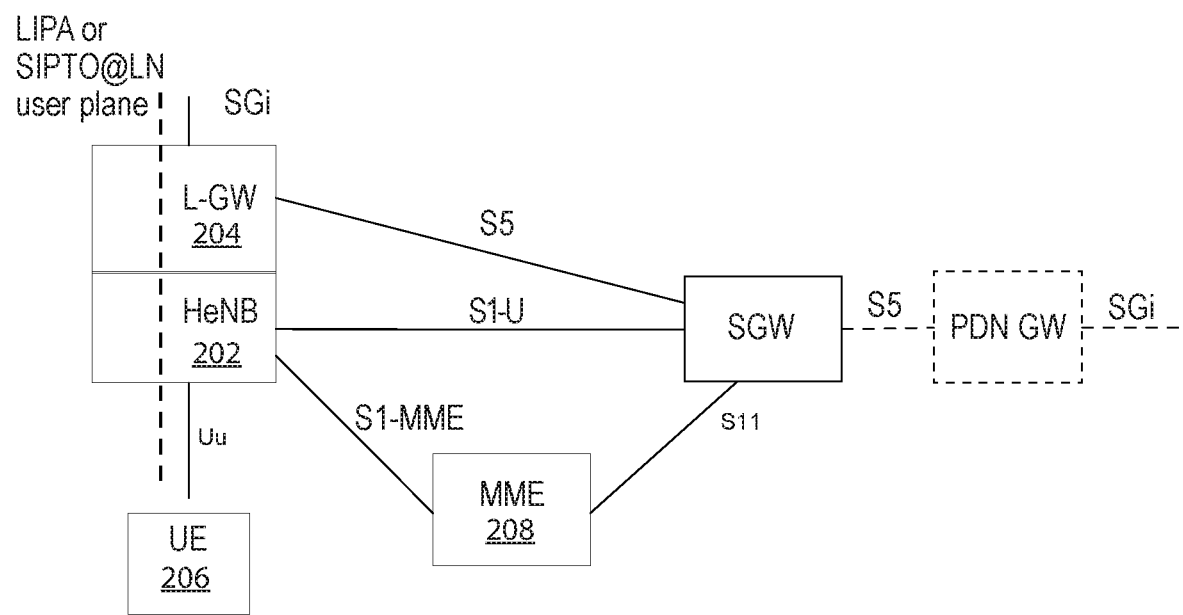
FIG. 2 depicts an example architecture for Local IP Access (LIPA) or Selected IP Traffic Offload (SIPTO) at a local network, wherein a Local Gateway (L-GW) is colocated with the HeNB.
Figure 3:
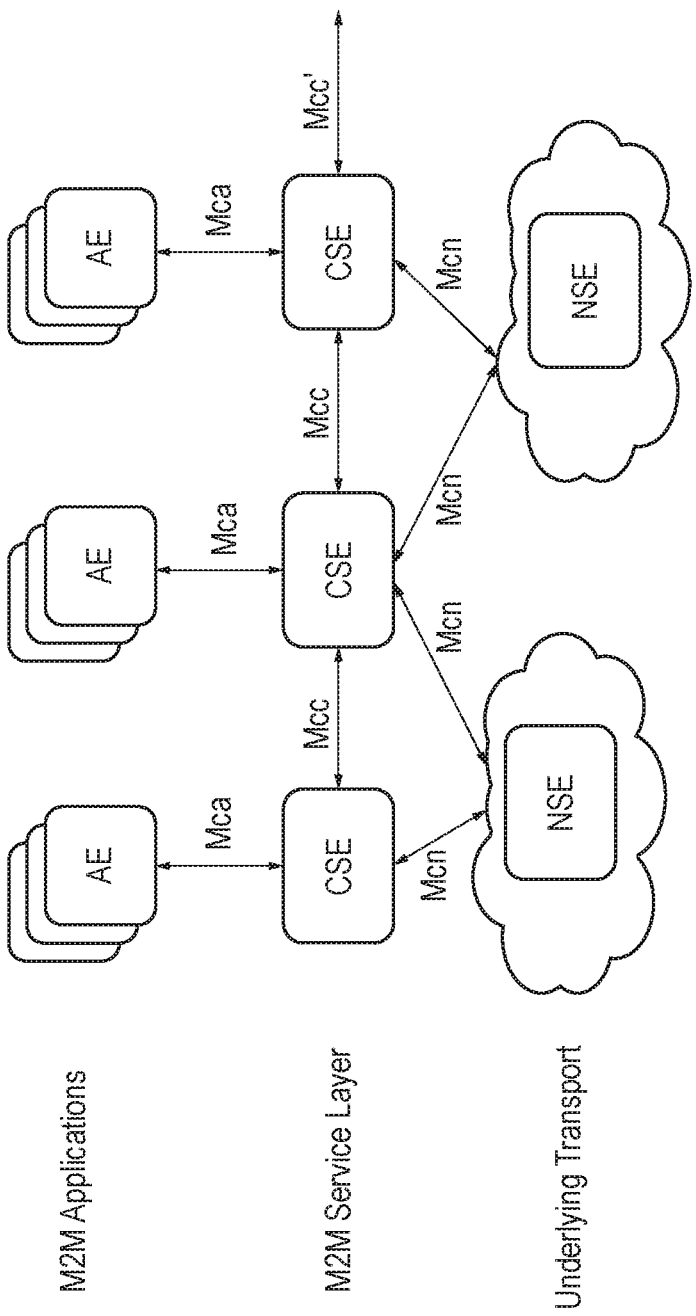
FIG. 3 is a simplified view of the oneM2M Functional architecture.
Figure 4:
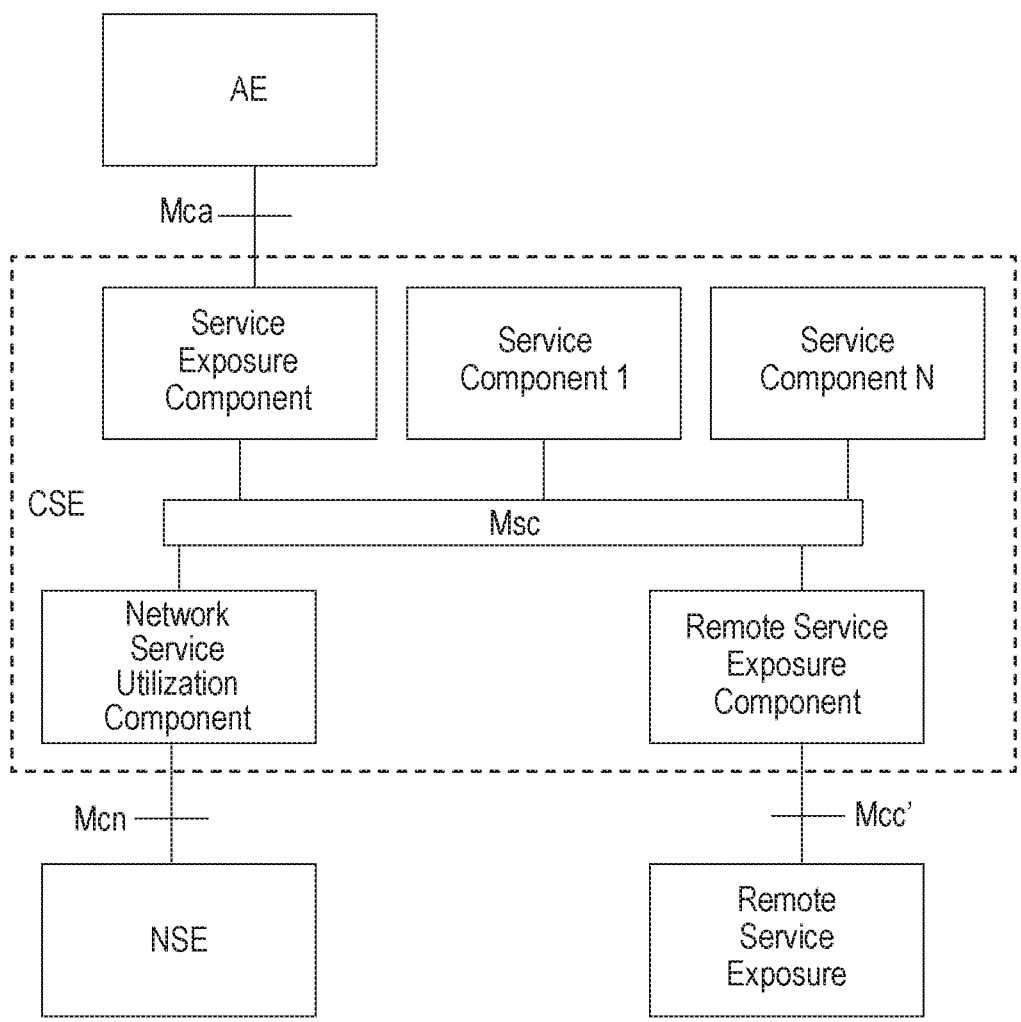
FIG. 4 is another view of the one M2M Functional architecture
Figure 5:
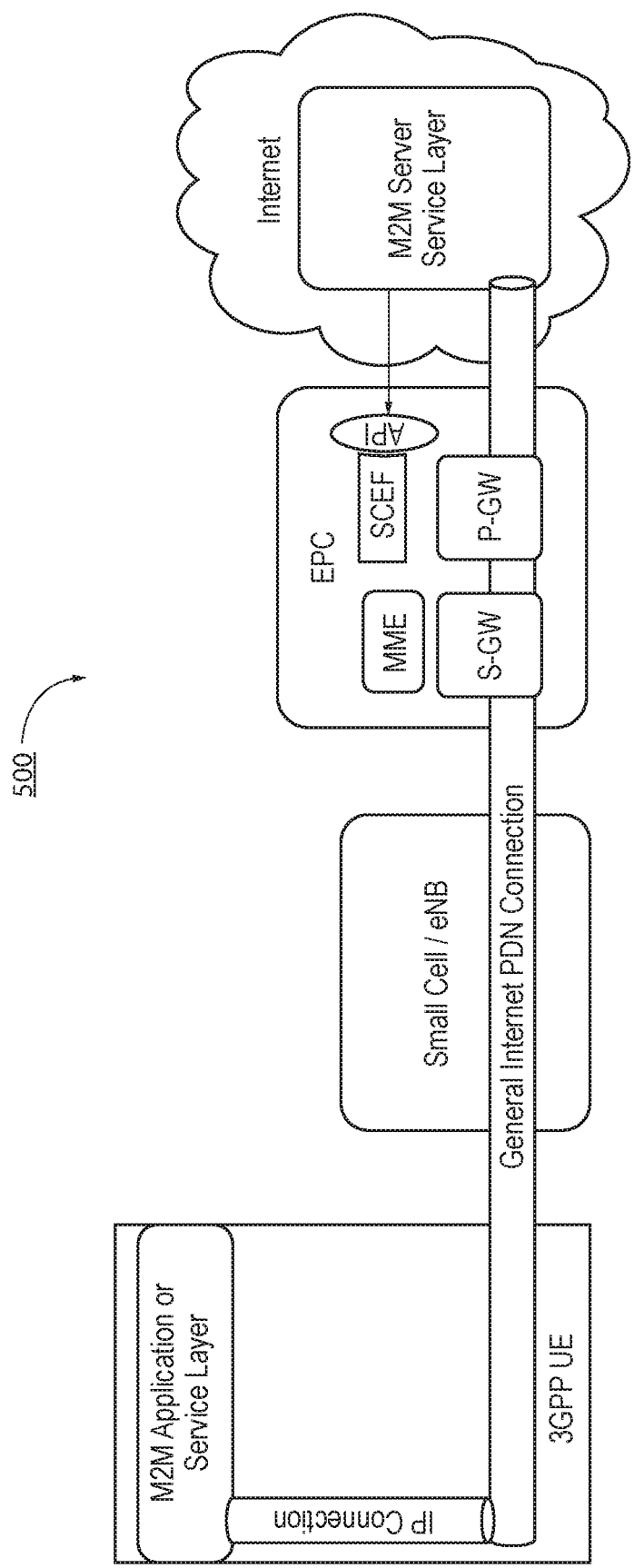
FIG. 5 is an example diagram of the existing 3GPP Interworking Architecture.

Referring to FIG. 5, an existing architecture 500 is shown. The architecture is described in 3GPP TR 23.708, "Architecture Enhancements for Service Exposure," which is incorporated by reference as if its contents are set forth herein. As shown, an API interface may be exposed to an M2M Server by the Core Network. The API interface may allow the M2M Server to request that devices be triggered, that the server receives notifications concerning devices that are connected to the network, and that the server receives notifications concerning devices that are no longer connected to the network.

Figure 6:
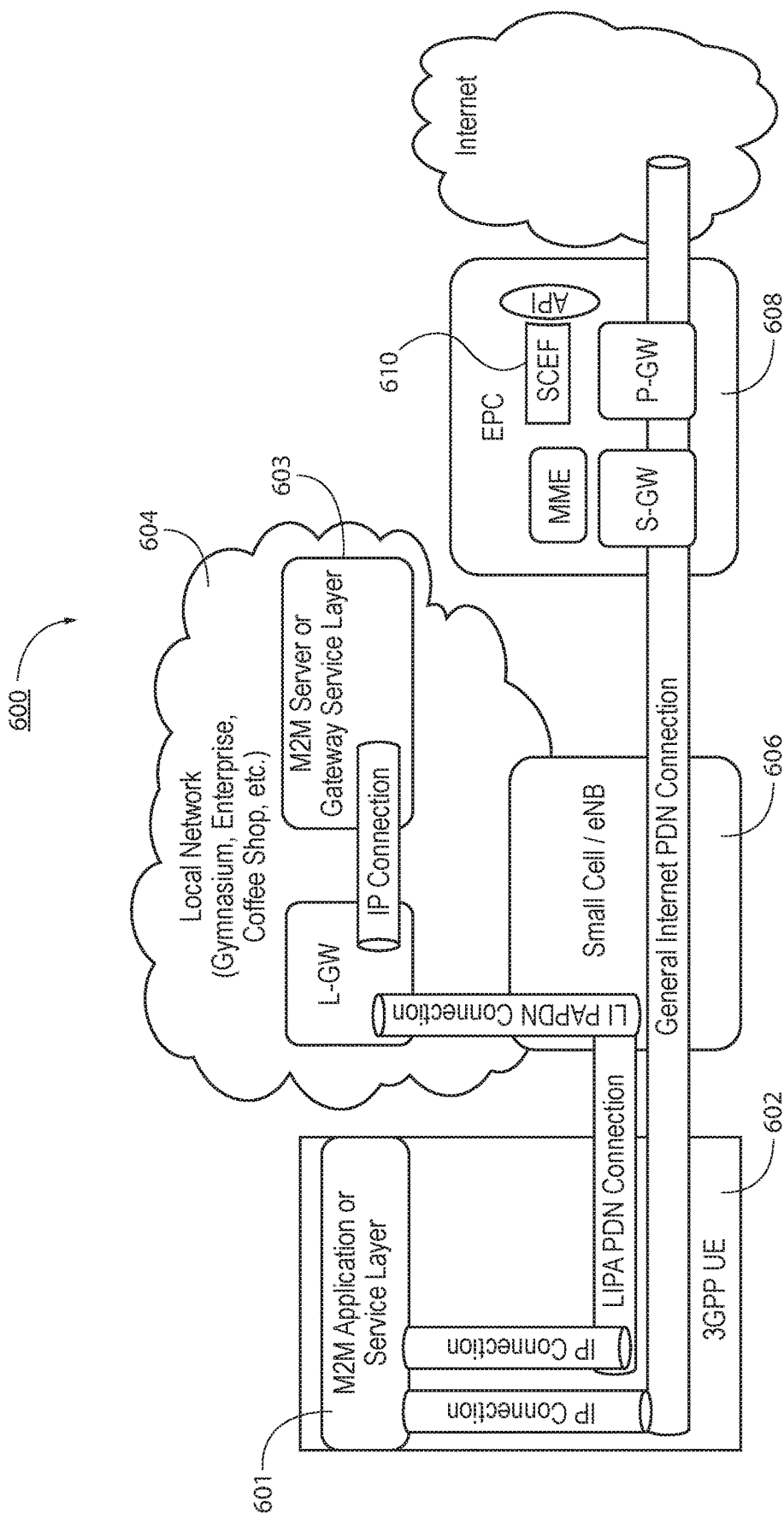
FIG. 6 is an example diagram of the existing 3GPP Interworking Architecture for the L-GW.

It is recognized herein that the 3GPP has not yet considered that a service layer may be hosted inside of a small cell network, and may be accessible to user equipments (UEs) via a Local Gateway (L-GW). The example deployment 600 that is shown in FIG. 6 is one example of how an application 601, or service layer 601 that is hosted on a 3GPP UE 602 might access a service layer 603 that is hosted in a local network 604. It is recognized herein that 3GPP has not considered how to expose the API's of FIG. 5 to service layers on a local network.

As used herein, the term service layer refers to a functional layer within a network service architecture. Service layers are typically situated above the application protocol layer such as HTTP, CoAP or MQTT, and provide value added services to client applications. The service layer also provides an interface to core networks at a lower resource layer, such as for example, a control layer and transport/access layer. The service layer supports multiple categories of (service) capabilities or functionalities including service definition, service runtime enablement, policy management, access control, and service clustering. Recently, several industry standards bodies (e.g., oneM2M) have been developing M2M service layers to address the challenges associated with the integration of M2M types of devices and applications into deployments such as the Internet/Web, cellular, enterprise, and home networks. An M2M service layer can provide applications and/or various devices with access to a collection of, or a set of, the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs that make use of message formats, resource structures, and resource representations defined by the M2M service layer. The CSE or SCL is a functional entity that may be implemented by hardware and/or software and that provides (service) capabilities or functionalities exposed to various applications and/or devices (e.g., functional interfaces between such functional entities) in order for them to use such capabilities or functionalities.

With particular reference to FIG. 6, it is shown that no interworking API's are exposed to the M2M Service Layer 603 that is in the local network 604. Thus, the M2M Server at the service layer 603 is not able to make various requests, including, for example, that devices be triggered, that the service layer 603 receive notifications when devices are connected to the network, and that the service layer 603 receive notifications when devices are no longer connected to the network.

By way of example, if the same API's are exposed by the Small Cell network 606 as are exposed by the Evolved Packet Core (EPC) 608, it is recognized herein that the enablement logic for such API's will be different. For example, it is recognized herein that it might not be efficient to route an API call from the Small Cell network 606 toward the SCEF 610 in the EPC 608 for processing, and route a response back down to the small cell network 606. In an example embodiment, new enablement logic is provided in the small cell network 606 so that the API's work.

Other issues are addressed herein. For example, still referring generally to FIG. 6, when the UE 602 connects to the Small Cell 606, the Service Layer 603 in the local network 604 will not be aware that the UE 602 is present unless the UE 602 initiates contact with the Service Layer 603. In an example embodiment, the local network 604 may expose an API that notifies the Service Layer 603 when UE's are connected to the small cell 606 and when UE's are capable of connecting to the Service Layer 603. As further described below, once the Service Layer 603 becomes aware that the UE 602 is available, the local network 604 may expose an API to allow the Service Layer 603 to initiate contact with the 3GPP UE 602 (e.g., send a trigger). When a given UE is connected to an M2M Service Layer, the local network may expose an API that notifies the service layer when the UE is no longer in the local network. By way of example, the UE may be no longer in the local network because the UE may have moved out of range of the small cell such that the US is only connected to the wide area network.

In accordance with various embodiments described below, an API is defined to expose the above-mentioned functionalities to the Local Network Service Layer. Further, necessary functionality in the Local Network, Small Cell, and Core Network is described herein to enable the API. In some cases in which the functionality is not provided by the Local Network, the UE may have to be provisioned to know that it should establish a LIPA connection when it is connected to certain small cells, and the small cells would have to be provisioned with the contact address (e.g., IP Address or FQDN) of the Local Network Service Layer. In such cases, the Service Layer might not be able to initiate contact with the UE.

Figure 7:
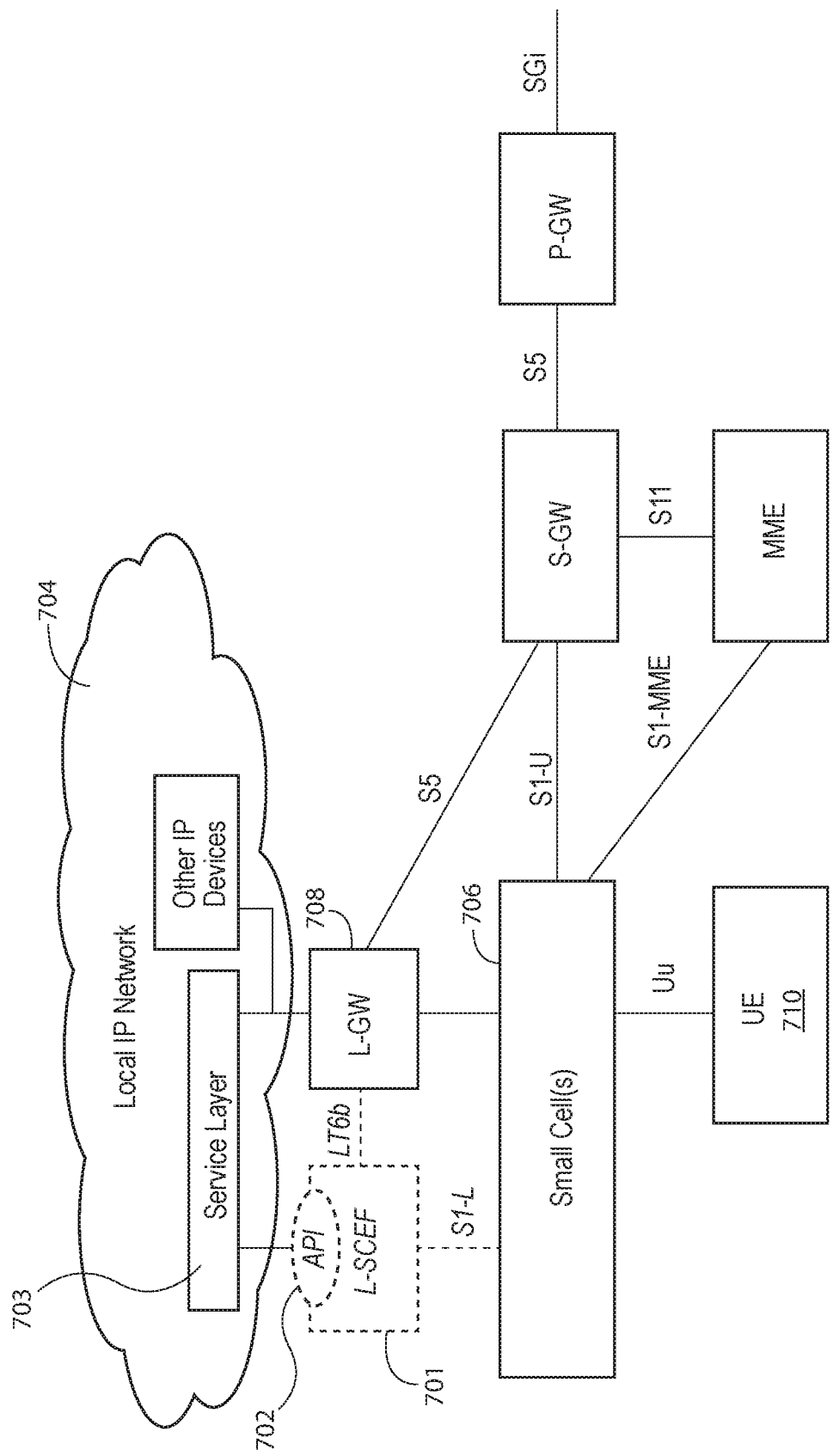
FIG. 7 is a block diagram of a small cell network and LIPA architecture that includes an example Local SCEF (L-SCEF) in accordance with an example embodiment.

Referring now to FIG. 7, in accordance with one embodiment, a Local Service Capability Exposure Function (L-SCEF) 701 is added to a small cell network. As shown, the L-SCEF 701 provides an API 702 to Applications and Service Layers (depicted collectively as a service layer 703) within the local network 704. The API 702 allows Applications and Service Layers in the local network 704 to access the service capabilities of the Small Cell 706 and a Local Gateway (L-GW) 708. Specifically, the L-SCEF 701 allows service layers, for instance the service layer 703 on the local network 704 to make trigger requests and receive connectivity notifications. In some cases, these two general classes of API functions (trigger request and connectivity notifications) may mirror the API's that are provided by the SCEF in the 3GPP Core Network to the SCS. The enablement logic, however, for sending the triggers and connectivity notifications may be different, as described below.

Still referring to FIG. 7, a Local Small Cell Network Architecture can be modified to support the L-SCEF 701, such that interworking with Local Network Service Layers is supported. The L-SCEF 701 may expose API's to the service layer 703. The API's may enable various following functionality such as, for example and without limitation, connectivity status notifications as described below and trigger requests as describe below.

With respect to connectivity status notifications, in some cases, the service layer 703 in the local network 704 may be notified when a given UE (e.g., a UE 710) connects to the Small Cell network and when the given UE is capable of establishing a LIPA PDN connection with the Service Layer 703. This notification may be sent when the UE attaches to the Small Cell 706 in the Small Cell Network or performs a path switch to the Small Cell Network. In some cases, the notification and trigger features might not be enabled for all UE's. For example, a UE may have information in its subscription information that indicates whether it is able to receive triggers from certain service layers. Information may also indicate whether certain service layers are authorized to receive notifications when the UE enters the small cell network. Alternatively, Service Layers may provide the L-SCEF 701 with the identities of the UE's for which it wishes to receive notifications.

In accordance with another example embodiment, as further described below, the service layer 703 may be notified when a UE leaves the Small Cell network and is no longer capable of establishing a packet data network (PDN) connection with the Service Layer 703. This notification may be sent when a UE detaches from a Small Cell in the Small Cell Network or performs a path switch away from the Small Cell Network.

With respect to trigger requests, as described below, the service layer 703 may trigger a UE. It will be understood that, as used herein, a "small cell network" may consist of more than one small cell and more than one Service Layer. In some cases, a single L-SCEF and L-GW may serve the entire local Small Cell network.

FIGS. 8-12 (described hereinafter) illustrate various embodiments of methods and apparatus for device triggers and connectivity notifications. In these figures, various steps or operations are shown being performed by one or more nodes, apparatuses, devices, functions, or networks. For example, the apparatuses may operate singly or in combination with each other to effect the methods described herein. As used herein, the terms apparatus, network apparatus, node, device, entity, network function, and network node may be used interchangeably. It is understood that the nodes, devices, functions, or networks illustrated in these figures may represent logical entities in a communication network and may be implemented in the form of software (e.g., computer-executable instructions) stored in a memory of, and executing on a processor of, a node of such network, which may comprise one of the general architectures illustrated in FIG. 19C or 19D described below. That is, the methods illustrated in FIGS. 8-12 may be implemented in the form of software (e.g., computer-executable instructions) stored in a memory of a network node, such as for example the node or computer system illustrated in FIG. 19C or 19D, which computer executable instructions, when executed by a processor of the node, perform the steps illustrated in the figures. It is also understood that any transmitting and receiving steps illustrated in these figures may be performed by communication circuitry (e.g., circuitry 34 or 97 of FIGS. 19C and 19D, respectively) of the node under control of the processor of the node and the computer-executable instructions (e.g., software) that it executes. It is further understood that the nodes, devices, and functions described herein may be implemented as virtualized network functions.

Figure 8:
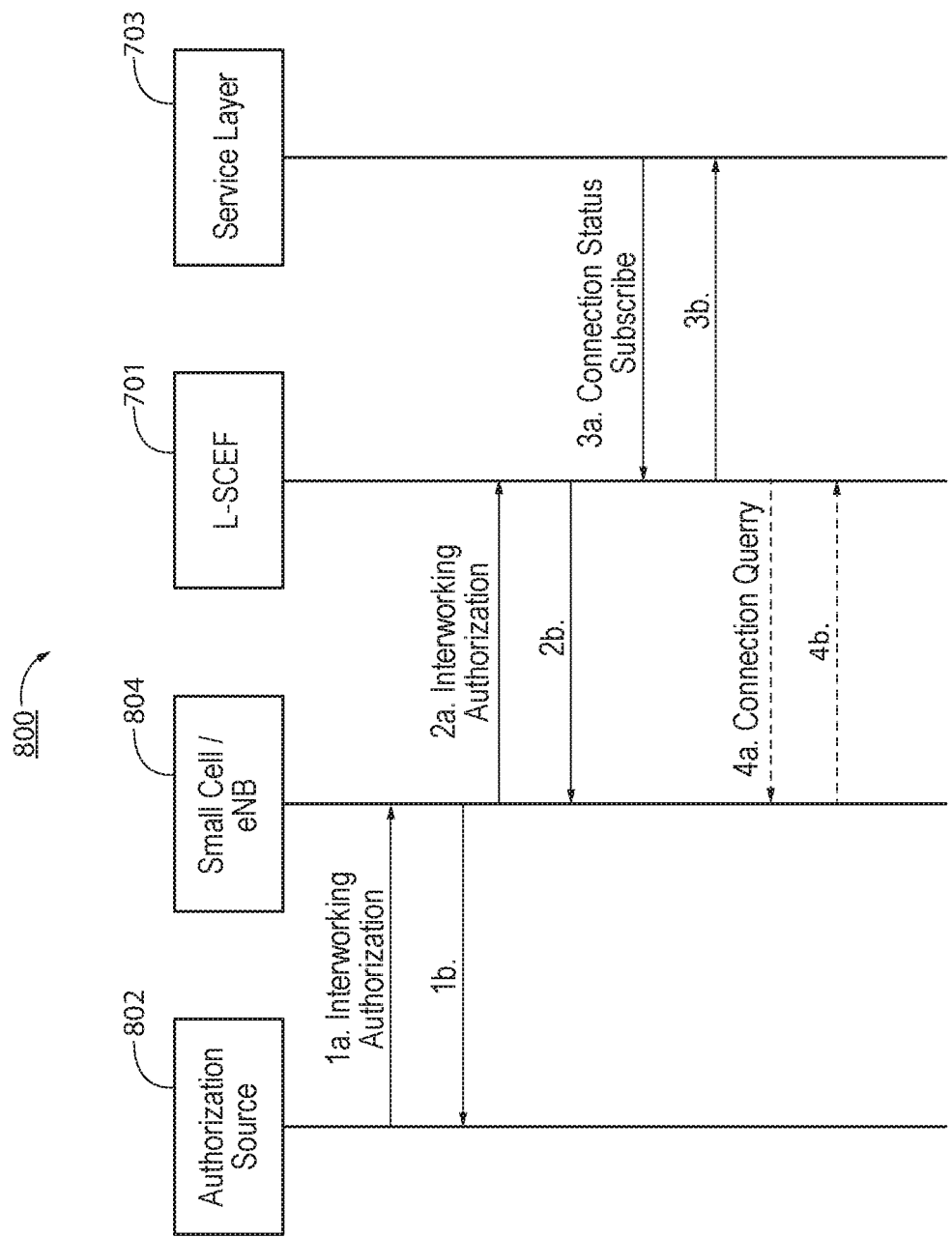
FIG. 8 is a call flow for the authorization of connectivity status notifications in accordance with an example embodiment.

Referring now to FIG. 8, a network 800 includes an authorization source 802, a small cell 804 or eNB 804 (which can be collectively referred to as a small cell/eNB 804, without limitation), the L-SCEF 701, and the service layer 703. It will be appreciated that the example network 800 is simplified to facilitate description of the disclosed subject matter and is not intended to limit the scope of this disclosure. Other devices, systems, and configurations may be used to implement the embodiments disclosed herein in addition to, or instead of, a network such as the network 800, and all such embodiments are contemplated as within the scope of the present disclosure.

A service layer in the local network, for instance the service layer 703, may request to be notified when a particular UE connects to the small cell network and when the particular UE is capable of connecting to the local IP network via the L-GW. Similarly, the Service Layer may be notified when the device disconnects from the Small Cell Network. In some cases, these features might not be enabled for all UE's. For example, these features may be enabled for UE's whose subscription indicates that they are capable of establishing a LIPA connection and that they have been authorized. In one embodiment, the L-SCEF 701 knows that a notification is required, and the L-SCEF 701 knows when to send the notification. In some cases, each Service Layer tells the L-SCEF 701 that it wants to be notified about the connectivity status of a particular UE, and the L-SCEF 701 is provisioned with information so that it knows whether the Service Layer is authorized to receive notifications about the UE (e.g., see FIG. 8). In one example, the L-SCEF 701 receives a notification from the small cell when the device connects or disconnects, and the L-SCEF 701 knows to notify the Service Layer that subscribed to the notification (e.g., see FIG. 9).

Referring in particular to FIG. 8, in accordance with the illustrated example, at 1a, the small cell 804 in the small cell network is provisioned so that it knows which UE's are authorized for connection status notifications, and which service layers are permitted to receive a notification related to a given UE. In some cases, each Small Cell in the Small Cell Network must be provisioned so that it knows which UE's are authorized for connection status notifications and which service layers are permitted to receive a notification related to a particular UE. Step 1a can be achieved in various ways.

In one example, the authorization source 802 is the management system. For example, a TR-069 Auto Configuration Server (ACS) may be pre-provisioned in each small cell of the small cell network via a management plane protocol, such as TR-069 for example. The TR-069 protocol is described in TR-069, CPE WAN Management Protocol, Issue 1: Amendment 4, July 2011. In other words, the TR-069 ACS can indicate to the Small Cell network which UE's are enabled for triggers, what service layers are allowed to trigger each UE, and/or which service layers should be notified about the presence of a particular UE.

In another example, the authorization source 802 is the Mobile Management Entity (MME). While the MME 802 is illustrated for purposes of example, it will be understood that the illustrated operations that are performed by the MME 802 may alternatively be performed by a core network function. For example, an indication that connection status notifications are permitted and an identification of the associated service layers can be maintained in the UE's subscription in the Home Subscriber Server (HSS). When a UE attaches to a given MME or moves to a given MME, the subscription information can be passed to the MME (or core network function). When the UE attaches to the Small Cell, the information can be passed to the Small Cell, as described in accordance with an example embodiment that is described with reference to FIG. 9. Thus, the UE's subscription information in the HSS can indicate whether the UE is enabled for triggers, what service layers are allowed to trigger the UE, and/or which service layers should be notified about the presence of the UE.

Figure 13:
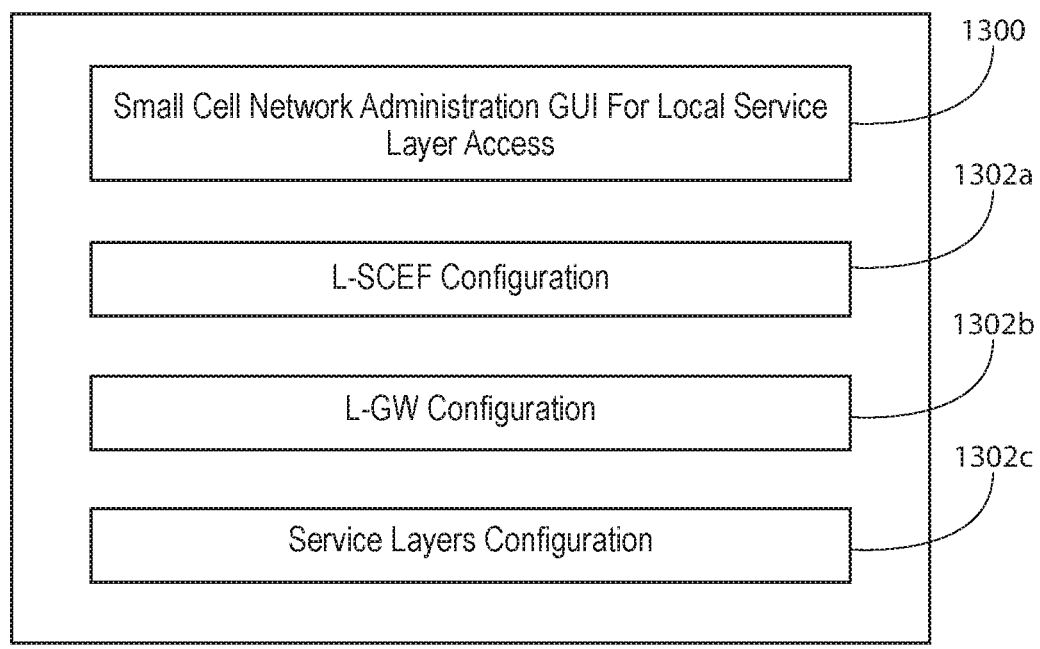
FIG. 13 is a view of an example small network local access configuration graphical user interface (GUI)
Figure 14:
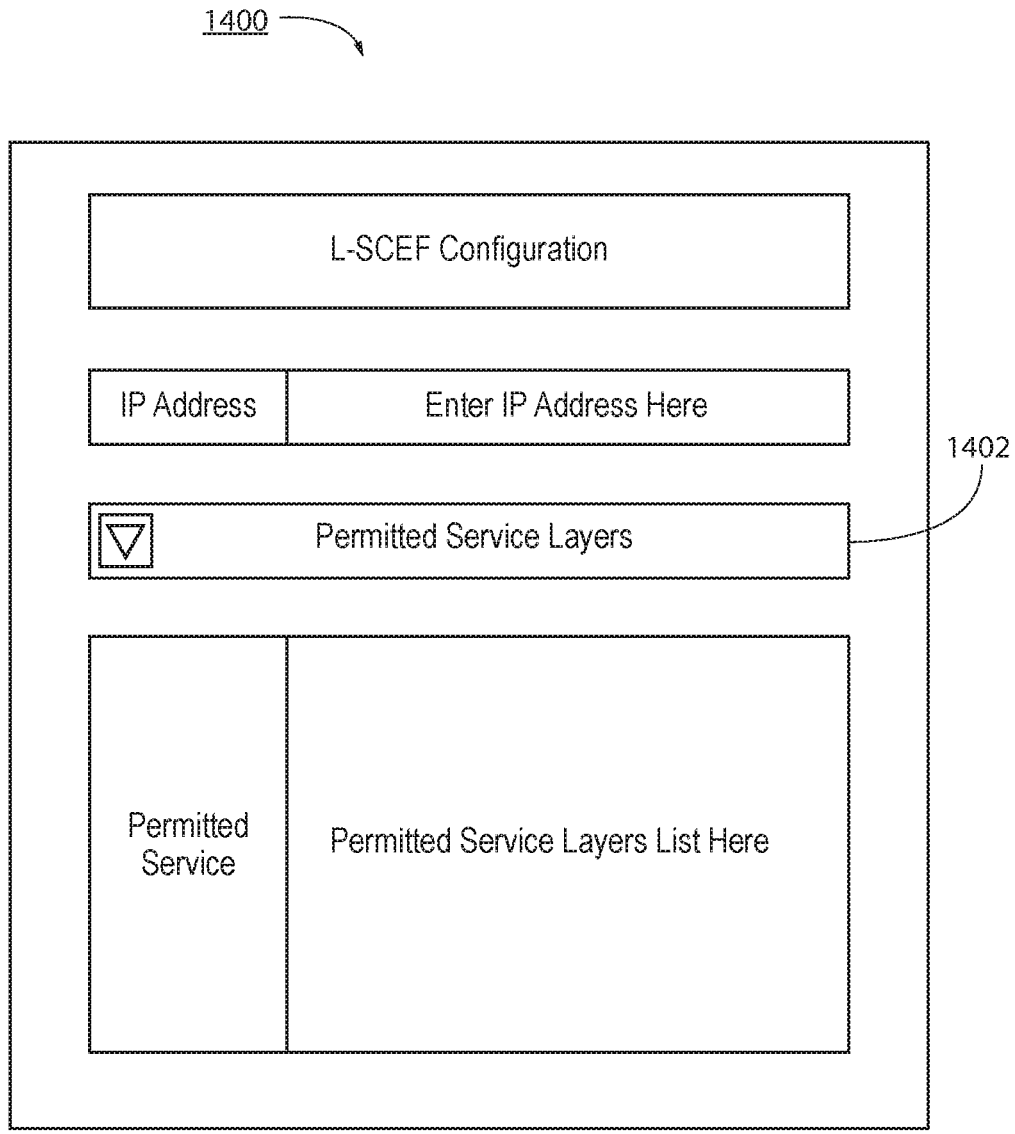
FIG. 14 is another view of the example small network local access configuration GUI.
Figure 15:
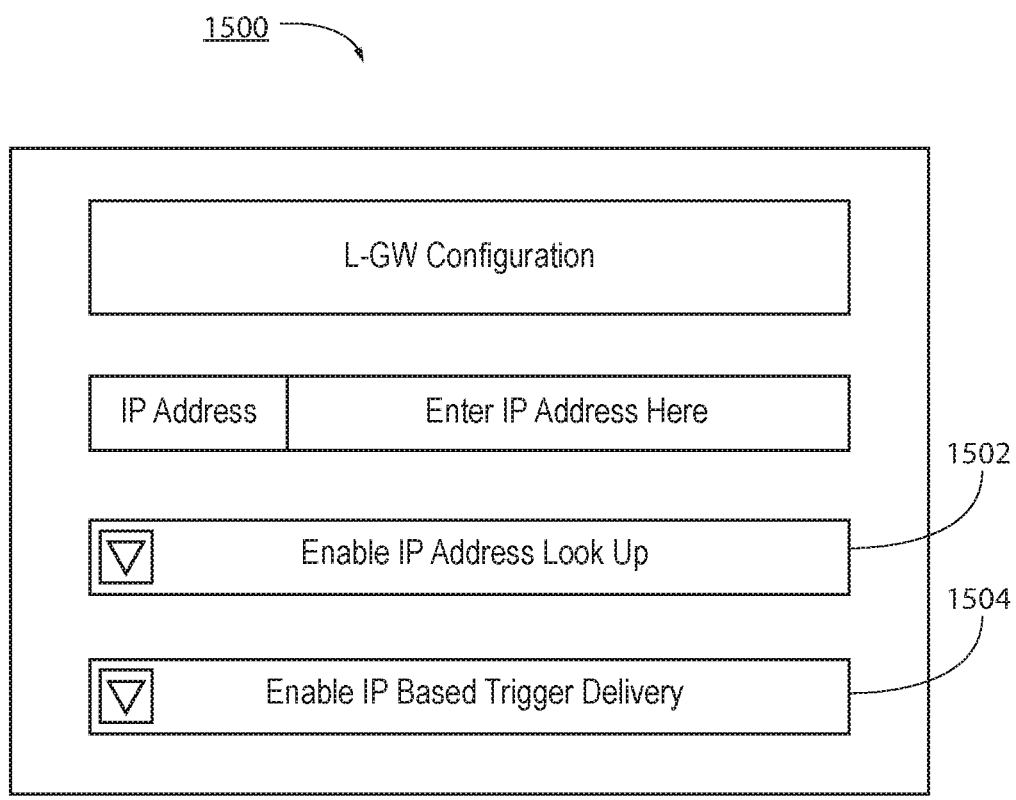
FIG. 15 is another view of the example small network local access configuration GUI.

In yet another example, still referring to FIG. 8, the authorization source may be an Administration Console or graphical user interface (GUI) that allows an administrator, such as a core network function for example, to provision the small cells in the small cell network. Examples of a GUI are shown in FIGS. 13-15, and are further described below. For example, a GUI or administration console that is associated with the local network can be used to indicate which UE's are enabled for triggers, what service layers are allowed to trigger each UE, and/or which service layers should be notified about the presence of each UE.

With continuing reference to FIG. 8, in yet another example, the authorization source 802 is the L-SCEF 701. For example, the information may be provisioned in the L-SCEF 701 via administrative means such as a console, GUI (e.g., see FIGS. 13-15), or a management system (e.g., via TR-069). By way of further example, the authorization source 802 may be an OMA DM Server or a core network function.

In accordance with an example embodiment, the Authorization Message at 1a may include the following information, presented by way of example and without limitation, an identifier of a server layer (e.g., the service layer 703) and an identifier of a UE. The UE identifier may be the MSISDN or an external identifier. An IMSI may also be used as the UE identifier, but the IMSI may be less attractive than other identifiers for security reasons. At 1b, in accordance with the illustrated example, the Small Cell 804 may acknowledge the authorization information.

At 2a, when the authorization source 802 is the MME, in accordance with one example, the Small Cell 804 may send a notification to the L-SCEF 701 each time a UE attaches, detaches, hands over into the small cell, or hands over out of the small cell. In some cases in which there are multiple small cells in the small cell network, the L-SCEF 701 may receive this notification each time the UE moves to a different small cell. Thus, the message at 2a may notify the L-SCEF 701 that a given UE device is available or not available, and the message at 2a may the L-SCEF 701 of which Small Cell the UE is attached. The Authorization Message at 2a may include the following information, presented by way of example and without limitation, an identifier of the service layer 703 (Service Layer Identifier), a UE identifier (e.g., an MSISN, external identifier, or IMSI), a Small Cell ID, and an "attached" or "detached" indication. At 2b, in accordance with the illustrated embodiment, the L-SCEF 701 may acknowledge the availability information. In some cases in which there is only one Small Cell in the small cell network, the L-SCEF 701 may be integrated with the Small Cell 804 and L-GW. Otherwise, the L-SCEF 701 may be deployed separately. If it is deployed separately, the interface between the L-SCEF 701 and Small Cell 804 may be Diameter-based and may be secured via Transport Layer Security (TLS), or it may be a customized protocol that uses the Stream Control Transmission Protocol (SCTP) as a transport, for example.

Still referring to FIG. 8, in accordance with the illustrated embodiment, at 3a, the Service Layer 703 subscribes to the connection status of a UE. The subscription request may include the following information, presented by way of example and without limitation, the service layer identifier, the UE identifier (e.g., MSISDN, an external identifier, IMSI, etc.), an action (e.g., subscribe), a subscription type (e.g., attached, detach), and a reference number. A reference number may be provided by the Service Layer 703 when the subscription is established. The L-SCEF 701 may provide the reference number back to the Service Layer 703 when the notification is sent so that the Service Layer 703 can correlate the notification with the subscription. The reference number may also assist the Service Layer 703 in determining what function to call when the notification is received. At 3b, the L-SCEF 701 may acknowledge the Subscription. At 4a, in accordance with the illustrated example, the L-SCEF 701 may query the small cell 704 that last sent the L-SCEF 701 a notification concerning a connection of a given UE, to check whether the UE is connected. Alternatively, for example, the L-SCEF 701 may query all small cells in the small cell network. The request may include the given UE's identifier. At 4b, the Small Cell 804 may respond with an indication of whether or not the UE is attached. If the Small Cell 804 responds that the UE is attached, then the L-SCEF 701 may choose to send a notification to the Service Layer 703.

Figure 9:
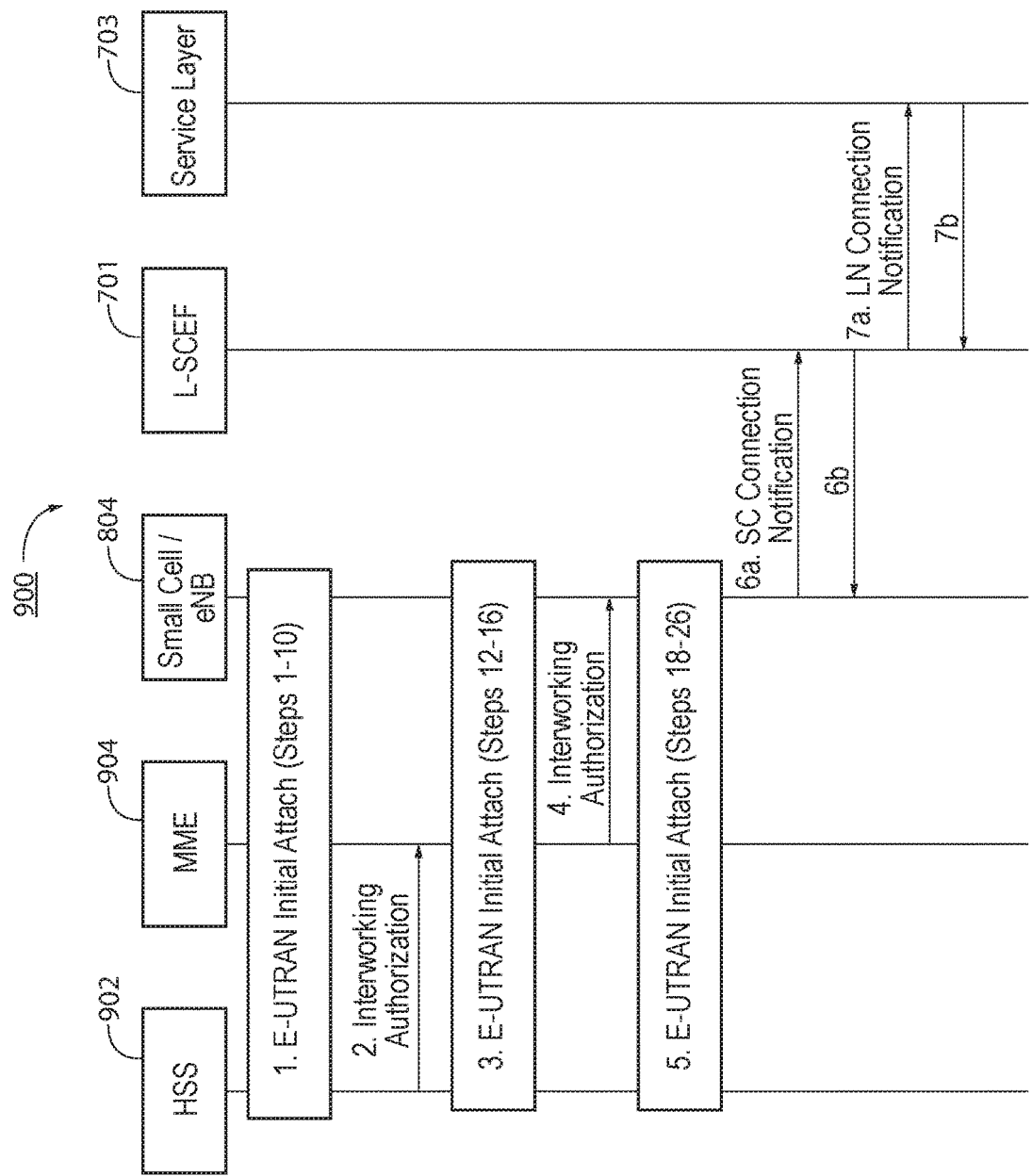
FIG. 9 is a call flow for connectivity notifications during Attach in accordance with an example embodiment.

Referring now to FIG. 9, an example connectivity status notification can be supported by modifying 1) the E-UTRAN Initial Attach procedure, described in Section 5.2.2.1 of 3GPP TS 23.401; 2) the Handover procedure described in Section 5.2.2.2 of 3GPP TS 23.401; and 3) the E-UTRAN Detach procedure described in Section 5.2.2.3 of 3GPP TS 23.401.

Still referring to FIG. 9, a network 900 includes an HSS 902, an MME 904, the small cell/eNB 804, the L-SCEF 701, and the example service layer 703. It will be appreciated that the example network 900 is simplified to facilitate description of the disclosed subject matter and is not intended to limit the scope of this disclosure. Other devices, systems, and configurations may be used to implement the embodiments disclosed herein in addition to, or instead of, a network such as the network 900, and all such embodiments are contemplated as within the scope of the present disclosure.

At 1, in accordance with the illustrated embodiment, the E-UTRAN Initial Attach procedure described in section 5.3.2.1 of 3GPP TS 23.401 begins. In some cases, if the eNB/Small Cell 804 is associated with an L-GW, then the address of the L-GW may be included in the Attach Request Message from the eNB/Small Cell 804 to the MME 904. Step 1 in FIG. 9 represents steps 1-10 of the E-UTRAN Initial Attach procedure described in section 5.3.2.1 of 3GPP TS 23.401. This step includes the initial attach request from the UE, the Update Location Request from the new MME (MME 904), and the Cancel Location message from the HSS 902 to the old MME. At 2, in accordance with the illustrated example, the MME 904 is informed by the HSS 902 that certain service layers are authorized to receive connection notifications when a UE is capable of connecting to particular L-GW's. The message at 2 may contain the following information, presented by way of example and without limitation, a UE Identifier (e.g., the MSISDN or External ID of the UE as defined in 3GPP TS 23.003), L-GW Addresses and Local Home Network Identifiers (e.g., for each address that is provide, one or more service layer identifiers may be provided, and service layer identifiers. For each L-GW ID, a set of service layer ID's that are allowed to receive notifications may be contained in the message. In some cases, the information at 2 may be passed to the MME 904 during an E-UTRAN initial Attach. For example, the information may be included in the "Update Location ACK" message from the HSS 902 to the MME 904. This corresponds to step 11 in the E-UTRAN Initial Attach procedure described in section 5.3.2.1 3GPP TS 23.401. At 3, the E-UTRAN Initial Attach procedure described in section 5.3.2.1 3GPP TS 23.401 continues. As shown, step 3 represents steps 12-16 of the E-UTRAN Initial Attach procedure described in section 5.3.2.1 of 3GPP TS 23.401. This step includes the Create Session Request from the new MME (MME 904) to the S-GW and the Create Session Response from the S-GW to the MME 904.

Still referring to FIG. 9, at 4, in accordance with the illustrated example, the MME 904 may inform the eNB/Small Cells which service layers in the local network are permitted to receive connectivity notifications if the eNB/Small Cell 804 provided an L-GW address/Local Home Network ID during the Attach Request of step 1 and the L-GW address/Local Home Network ID matches one of the L-GW address/Local Home Network ID that were provided to the MME 904 by the HSS 902 in step 2. The message at 4 may contain the following information, presented by way of example and without limitation, a UE identifier (e.g., the MSISDN or External ID of the UE), L-GW Addresses and Local Home Network Identifiers, and service layer identifiers. In an example the address of the L-GW in the local network address matches the address that was provided to the MME 904 in step 2. Thus, it might not be required to be part of the message at 4. For each L-GW ID, a set of service layer ID's that are allowed to receive notifications may be contained in the message at 4. In some cases, the information at 4 may be passed to the MME 904 during an E-UTRAN initial Attach, and the information may be included in the "Initial Context Setup Request/Attach Accept" message from the HSS 902 to the MME 904. This corresponds to step 17 in the E-UTRAN Initial Attach procedure described in section 5.3.2.1 of 3GPP TS 23.401. At 5, in accordance with the illustrated example, the E-UTRAN Initial Attach procedure described in section 5.3.2.1 of 3GPP TS 23.401 completes. As shown, step 5 represents steps 18-26 of the E-UTRAN Initial Attach procedure described in section 5.3.2.1 of 3GPP TS 23.401. This step includes the RRC Connection Reconfiguration between the UE and eNB and the attach accept from the new MME to the UE.

At 6a, in accordance with the illustrated example, a small cell connection notification is sent to the L-SCEF 701 from the Small Cell/eNB 804. For example, the Small Cell/eNB 804 notifies the L-SCEF 701 that the UE has attached. The message at 6a may serve both as a notification that the UE is attached and a notification that there are service layer(s) in the local network that are permitted to receive notifications when the UE attaches. The message at 6a may include the following information, presented by way of example and without limitation, the UE identifier (e.g, MSISND or external ID), service layer identifiers associated with service layers that are allowed to receive notifications, and a cause (e.g, Attach, Detach, UE is no longer part of the Closed Subscriber Group (CSG), etc.). At 6b, the L-SCEF 701 may acknowledge the notification by sending a message to the Small Cell/eNB 804. At 7a, in accordance with the illustrated example, a Local Network Connection Notification) is sent to the service layer 703 by the L-SCEF 701. For example, if a given service layer (e.g., the service layer 703) previously requested a notification corresponding to the UE's connectivity, the Small Cell/eNB 804 may send a Connection Notification to the L-SCEF 701 indicating that the UE is attached. If the given service layer (e.g., service layer 703) is authorized to receive a notification, then the notification may be forwarded to the Service Layer at 7a. The message at 7a may include the identifier of the UE, as described above. At 7b, the Service Layer 703 acknowledges the notification.

Turning now to connection notifications during handover, in some cases, when a UE moves to a Small Cell/eNB, the Small Cell/eNB must be notified if there are Service Layers in the local network that are permitted to receive connectivity notifications. In one embodiment, the Tracking Area Update (TAU) procedure is updated so that the Small Cell/eNB is notified if Service Layers in the local network are permitted to receive connectivity notifications. A TAU may be required after or during successful handovers (X2 and S1). Thus updating the TAU procedure guarantees that a notification is sent during all handovers in accordance with an example embodiment. The current tracking area update procedures are described in section 5.3.3 of reference 3GPP TS 23.401. A tracking area update procedure is executed after each successful X2 or S1 hand over. Thus it is recognized herein that the TAU may be modified to notify the new Small Cell/eNB if there are Service Layers in the local network that are permitted to receive connectivity notifications.

By way of example, when the eNB receives a "TAU Request" from a UE, it will forward the "TAU Request" to the MME. The eNB may send additional information to the MME, such as the L-GW Address or Local Home Network ID for example. Currently, when the MME responds to with a "TAU Accept", the message is passed to the UE by the eNB. The eNB does not extract any information from the request. In an example embodiment, the MME sends additional information to the Small Cell/eNB so that the Small Cell/eNB will know that there are Service Layers in the local network that are permitted to receive connectivity notifications. This may be done in a way that is similar to how the eNB sends additional information to the MME with the "TAU Request" message. When a UE performs TAU as described in section 5.3.3 of 3GPP TS 23.401, if the MME provided an L-GW address/Local Home Network ID and it matches one of the L-GW addresses/Local Home Network IDs that were provided to the MME by the HSS, then the MME may inform the eNB/Small Cell which service layers in the local network are permitted to receive connectivity notifications. The message sent by the MME may contain the following information, presented by way of example and without limitation, the UE Identifier (e.g., MSISDN or External ID of the UE), L-GW Addresses and Local Home Network Identifiers (e.g., the address of the L-GW in the local network), and service layer identifiers. The L-GW addresses may match the address that was provided to the MME in the "TAU Request". Thus, it might not require being part of the message. The service layer identifiers in the message may be a set of service layer ID's that are allowed to receive notifications. In accordance with the above-described embodiment, the updated "TAU Accept" may cause the Small Cell/eNB to send the "Small Cell Connection Notification" message (described above, e.g., at 6a of FIG. 9) to notify the L-SCEF that the UE is now connected to the Small Cell/eNB. In some cases, if a service layer previously requested a notification for the UE's connectivity, then the "SC Connection Notification" may cause the L-SCEF to send a "LN Connection Notification" to the service layer indicating that the UE is attached (see, e.g., FIG. 9 at 7a).

In some cases, if the handover source Small Cell/eNB was also in the Local Network, then the UE may have already been attached to the local network. Thus, the "SC Connection Notification" may serve as a notification to the L-SCEF that the UE is now connected via a different Small Cell/eNB. Further, the "LN Connection Notification" message may not be necessary.

In an alternative embodiment, the X2 handover procedure is updated so that the Small Cell/eNB is notified if Service Layers in the local network are permitted to receive connectivity notifications. With respect to X2 handovers, when a UE performs an X2-Based Handover as described in section 5.5.1.1 of 3GPP 23.401, the target Small Cell/eNB indicates the L-GW Address/Local Home Network ID to the MME in the "Path Switch Request" message. If the target eNB/Small Cell provided an L-GW address/Local Home Network ID, and it matches one of the L-GW addresses/Local Home Network IDs that was provided to the MME by the HSS, then the "Path Switch Request Ack" message is modified, in accordance with an example, to inform the eNB/Small Cell which service layers in the local network are permitted to receive connectivity notifications. Thus, the "Path Switch Request Ack" message may include the following information, presented by way of example and without limitation, the UE Identifier (e.g., MSISDN or External ID of the UE), L-GW Addresses and Local Home Network Identifiers (e.g., the address of the L-GW in the local network), and service layer identifiers. The L-GW addresses may match the address that was provided to the MME in the "TAU Request". Thus, it might not require being part of the message. The service layer identifiers in the message may be a set of service layer ID's that are allowed to receive notifications. In accordance with the above-described embodiment, the updated "Path Switch Request Ack" may cause the Small Cell/eNB to send the "SC Connection Notification" message to notify the L-SCEF that the UE is now connected to the Small Cell/eNB (e.g., see FIG. 9 at 6a). If a service layer previously requested a notification concerning the UE's connectivity, then the "SC Connection Notification" may cause the L-SCEF to send a "LN Connection Notification" to the service layer indicating that the UE is attached (e.g., see FIG. 9 at 7a). In some cases, if the source Small Cell/eNB was also in the Local Network, then the UE may have already been attached to the local network. Thus, the "SC Connection Notification" may serve as a notification to the L-SCEF that the UE is now connected via a different Small Cell/eNB. Further, the "LN Connection Notification" message may not be necessary.

Turning now to connection notifications during detach, a Small Cell may send an "SC Connection Notification" (Small Cell Connection Notification) to the L-SCEF when the "S1 Release Procedure" completes. This notification may be used to indicate to the L-SCEF that a UE is detached from the small cell. This notification may serve both as a notification that the UE is detached and as a notification that there are service layer(s) in the local network that should receive notifications when the UE detaches. The message may include the following information, presented by way of example and without limitation, the UE identifier (e.g, MSISDN or External ID of the UE), one or more service layer identifiers associated with service layers that are permitted to receive notifications, and a cause (e.g., Attach, Detach, UE no longer part of CSG, etc.)

The "S1 Release Procedure" is detailed in section 5.3.5 of 3GPP 23.401. The "S1 Release Procedure" is executed when the UE detaches and for other causes, such as when the UE is removed from the Small Cell's CSG for example. The Small Cell may indicate the cause to the L-SCEF so that the L-SCEF may indicate the cause to the Service Layer.

Described above are examples of how a service layer can be notified when a UE is in a Small Cell Network. Once a Service Layer knows that the UE is in the Small Cell network, the Service Layer may decide that it wants to establish a user plane connection with the UE. However, the UE may or may not have a LIPA PDN connection with the L-GW. In other words, the UE may or may not be connected to the local IP network. If the UE is connected to the Local IP network, the Service Layer might not be able to initiate a connection with the UE because it does not know the IP address of the UE. Described below are examples of trigger requests that may address the above-described scenario, among others.

Figure 10:
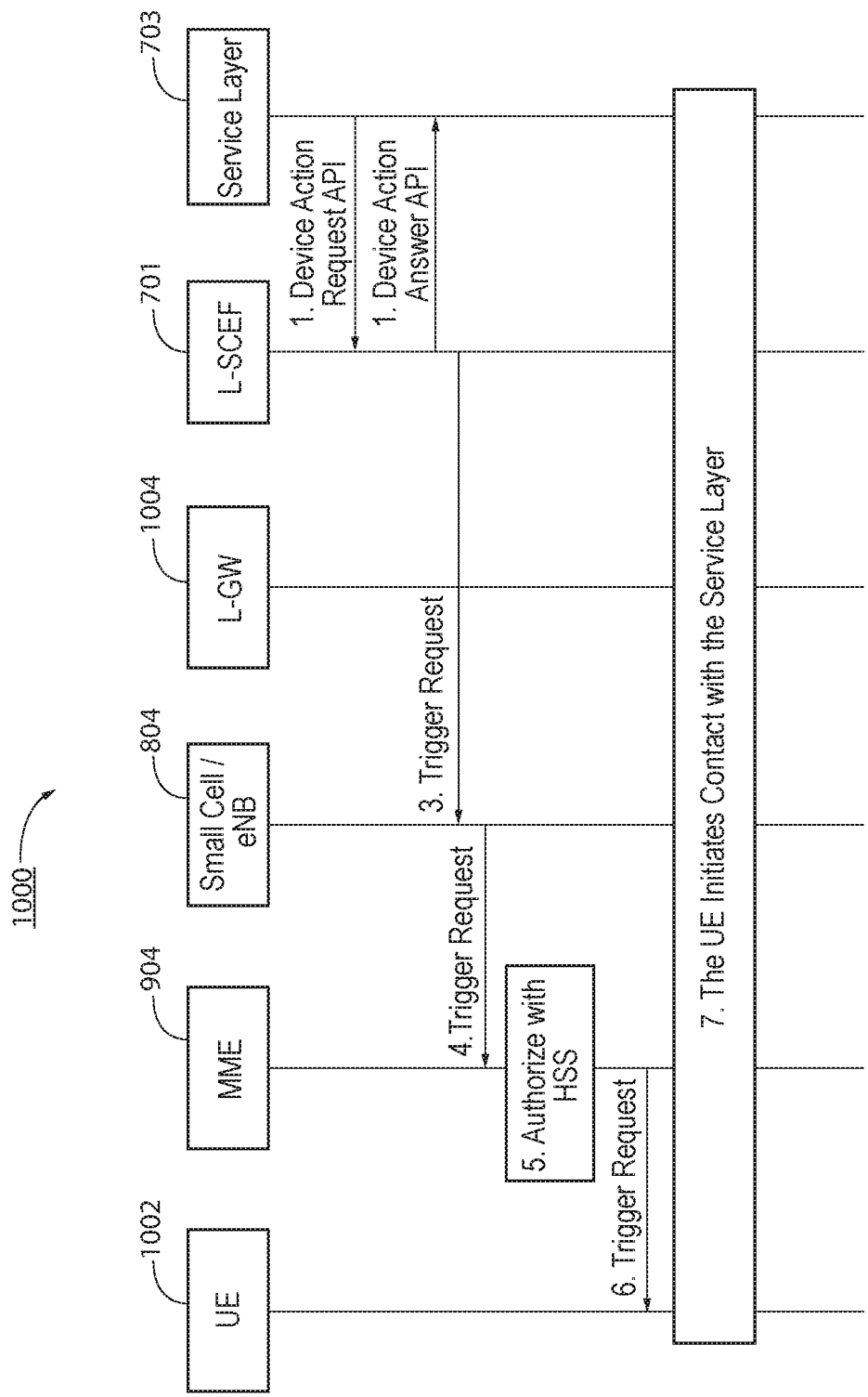
FIG. 10 is a call flow for Non-Access Stratum Trigger Delivery in accordance with an example embodiment.

In one example embodiment, triggers are NAS based. Referring to FIG. 10, a trigger may be delivered to a UE in a NAS message. The trigger may be used as an indication that the UE should establish a LIPA PDN connection. The trigger may include the APN that the UE should use to establish the PDN connection and/or the Identifier of the Service Layer in the local network. For example, the Service Layer Identifier may be an IP Address and Port Number or an FQDN.

Still referring to FIG. 10, an example network 1000 includes a UE 1002, the example MME 904, the example small cell/eNB 804, an example L-GW 1004, the example L-SCEF 701, and the example service layer 703. It will be appreciated that the example network 1000 is simplified to facilitate description of the disclosed subject matter and is not intended to limit the scope of this disclosure. Other devices, systems, and configurations may be used to implement the embodiments disclosed herein in addition to, or instead of, a network such as the network 1000, and all such embodiments are contemplated as within the scope of the present disclosure. At 1, in accordance with the illustrated embodiment, the Service Layer 703 uses the Device Action Request API of the L-SCEF 701 to request a trigger. The API allows the Service Layer 703 to provide various information, such as, for example and without limitation, an ID associated with the service layer 703 (Service Layer ID), an ID associated with the UE 1002 (Device ID), an application identifier, a trigger payload, a reference number, an action type, and trigger type. The Service Layer ID may be an IP Address, FQDN, or other alpha numeric value that identifies the Service Layer 703. The Device ID may be, for example, an MSISDN, an External UE Identifier, or an IMSI. Alternatively, the identifier of the UE 1002 may be an alpha numeric value that is provisioned in the Service Layer 703 and the L-SCEF 701. In one example, the L-SCEF 701 may map the value from the alpha numeric value to a 3GPP identifier, such as an MSISDN, External UE Identifier, or IMSI for example. The application identifier may be a value that identifies which application (e.g., service layer) on the UE 1002 should receive the trigger. For example, this value may be an integer port number. The trigger payload may include an application specific message for the recipient application. The payload may carry the following information, presented by way of example and without limitation, a LIPA APN, a Service Layer IP Address or FQDN, and a Service Layer Port Number. The reference number may be an optional field in the message at 1. The reference number field may be an integer value that is provided by the service layer 703. For example, the L-SCEF 701 may include this reference number value in the Trigger Answer so that the Service Layer 703 can correlate the Trigger Requests and Answers with each other. Alternatively, or additionally, the reference number value may be included in any CDRs that are generated by the L-GW 1004, Small Cell 804, MME 904, and HSS, for example, so that the CDR's can be correlated with the Service Layer's request. The action type may indicate that the request at 1 is a trigger or an IP Address Look Up. An example of the IP address look up option is described below. The trigger type may be an optional field that allows the Service Layer 703 to indicate what types of trigger delivery (e.g., NAS, SMS, UDP/IP) should be supported.

At 2, in accordance with the illustrated example, the L-SCEF 701 replies to the Trigger Request with an indication of whether or not the request is authorized by the L-SCEF 701. The response at 2 may also indicate whether the trigger will be attempted. At 3, the L-SCEF 701 forwards the Trigger Request to the Small Cell 804. If the Device ID that was provided in the message at 1 was an Alpha Number Value, for example, then the L-SCEF 701 may convert the Device ID to an IMSI, MSISDN, or an External Identifier. Alternatively, if the Device ID that was provided in the message at 1 was an External Identifier, for example, then the L-SCEF 701 may convert the Device ID to an IMSI or MSISDN. At 4, the Small Cell/eNB 804 forwards the Trigger Request to the MME 904. The message at 4 may be sent in a new S1-AP message on the S1-MME interface. For example, the Small Cell/eNB 804 may maintain an S1-MME context for each UE that is attached to the Small Cell 804. In accordance with an example embodiment, the Small Cell/eNB 804 also maintain a Special S1-MME context for the L-SCEF 701. This S1-MME context may be used by the L-SCEF 701 to transfer NAS PDU's to the MME 904. The NAS PDU's may carry signaling such as Trigger Requests, Authorization Requests, etc. When a NAS PDU is sent by a UE (e.g., the UE 1002) to the MME 904, it may be sent through the eNB/Small Cell 804 such that the eNB/Small Cell 804 is not able to inspect the contents. The UPLINK NAS TRANSPORT message, as described in 3GPP TS 36.413, "Evolved Universal Terrestrial Radio Access Network (E-UTRAN); S1 Application Protocol (S1AP)," which is incorporated by reference as if set forth in its entirety herein, can be used to carry the trigger request to the MME 904. In one example, a special MME UE S1AP ID and eNB UE S1AP ID is established for the S1AP context that is to be associated with the L-SCEF 701. The NAS PDU in the UPLINK NAS TRANSPORT message may carry a new "Trigger-Request" message. The "Trigger-Request" message may carry various information elements, such as, for example and without limitation, the Service Layer ID (e.g., an IP Address, FQDN, or other alpha numeric value that identifies the Service Layer) and the Device ID, Application Identifier, and Trigger Payload that was provided at 3. Alternatively, the eNB/Small Cell 804 may map the device identity from 3 to an S-TMSI. In some cases in which the eNB/Small Cell 804 does this, it may also send the trigger request to the MME 904 on the UE's S1-MME context, rather than the special L-SCEF S1-MME context.

At 5, in accordance with the illustrated example, the MME 904 sends an Authorization request to the HSS. The Authorization request may include the Device ID, Service Layer ID, and Reference number. The Authorization request may also include the Small Cell/eNB Identity or the Local Network Identifier. The MME 904 may map the Device ID to an IMSI before the request is sent to the HSS, or the MME may send the Device ID to the HSS and the HSS may map the ID to an IMSI. In an example, the HSS verifies that the ID associated with the Service Layer 703 is permitted to trigger the UE 1002. The HSS may optionally check if the Service Layer 703 is permitted to trigger the UE 1002 with the indicated Local Network or Small Cell/eNB 804. At 6, the MME 904 may deliver the Trigger to the UE 1002 in a NAS PDU in a DOWNLINK NAS TRANSPORT MESSAGE. The NAS PDU may contain the Trigger Payload, Application ID, and Reference Number. In some cases, for example if there is not a LIPA PDN connection already established, the UE 1002 establishes a LIPA PDN connection with the APN that was indicated in the Trigger request. The UE 1002 may then establish contact with the Service Layer 703 in the Local Network. The UE 1002 may obtain the Service Layer's IP Address and Port Number from the Trigger Request, or it may obtain an FQDN from the trigger request and map it to an IP Address and Port Number. "Establishing Contact" with the Service Layer 703 may indicate that an Application or Service Layer on the UE 1002 registers with the Service Layer 703 in the local network.

As an alternative example, the Small Cell 804 may bypass the MME 904 and send the trigger directly to the UE 1002 in an RRC message. It is recognized herein, however, that passing the trigger request back to the core network before sending it to the UE 1002 allows the Core Network to inspect the traffic, for example, for charging purposes. For example, the MME and/or HSS can generate charging records for the request. The MME and HSS can create CDR's for the operation. Additionally, passing the trigger request back to the core network before sending it to the UE 1002 allows the Core Network to authorize the request via the MME and/or HSS.

In another example embodiment, the trigger delivery is SMS based. For example, referring again to FIG. 10, at 3, the eNB/Small Cell 804 or L-SCEF 701 may convert the Trigger Request to an SMS message. The destination address (DA) header field of the SMS may be populated with the MSISDN of the recipient device (e.g., the UE 1002). The Application Port Identifier header field of the SMS may be populated with the Application Identifier that was provided by the L-SCEF 701. The SMS Payload may be populated with the Trigger payload that was provided by the L-SCEF 701. The origination address (OA) header field of the SMS may be populated with an MSISDN that is assigned to the eNB/Small Cell 804, L-SCEF 701 or Service Layer 703. The Protocol Identifier (PID) header field of the SMS may be set to indicate that the SMS is a trigger.

At 4, continuing with the SMS-based trigger example, the MME 904 may choose to reject any SMS with an origination address that indicates that the SMS came from a Service Layer, and with a PID field that does not indicate that the SMS is a trigger. Similarly, the MME 904 may reject any SMS with an origination address that indicates that the SMS did not come from a Service Layer, and with a PID field that indicates that the SMS is a trigger. The MME 904 may then deliver the SMS message to the SMS-IWMSC/SMS-SC as it would normally deliver a Mobile Originated SMS. The SMS-SC may verify that the originating address is permitted to trigger the destination address, and then the SMS-SC may deliver the trigger using existing SMS over NAS Mobile Terminated SMS procedures.

In an alternative approach, the MME 904 may choose to not deliver the SMS to the SMS-SC, and the MME 904 may deliver the SMS directly to the recipient UE 1002. The authorization may be performed via information from the HSS. Normally, this might not be possible, however, the MME 904 may conclude that because the SMS is a trigger and it originated in a local network, the recipient must be in the local network and attached to the same MME pool.

Figure 11:
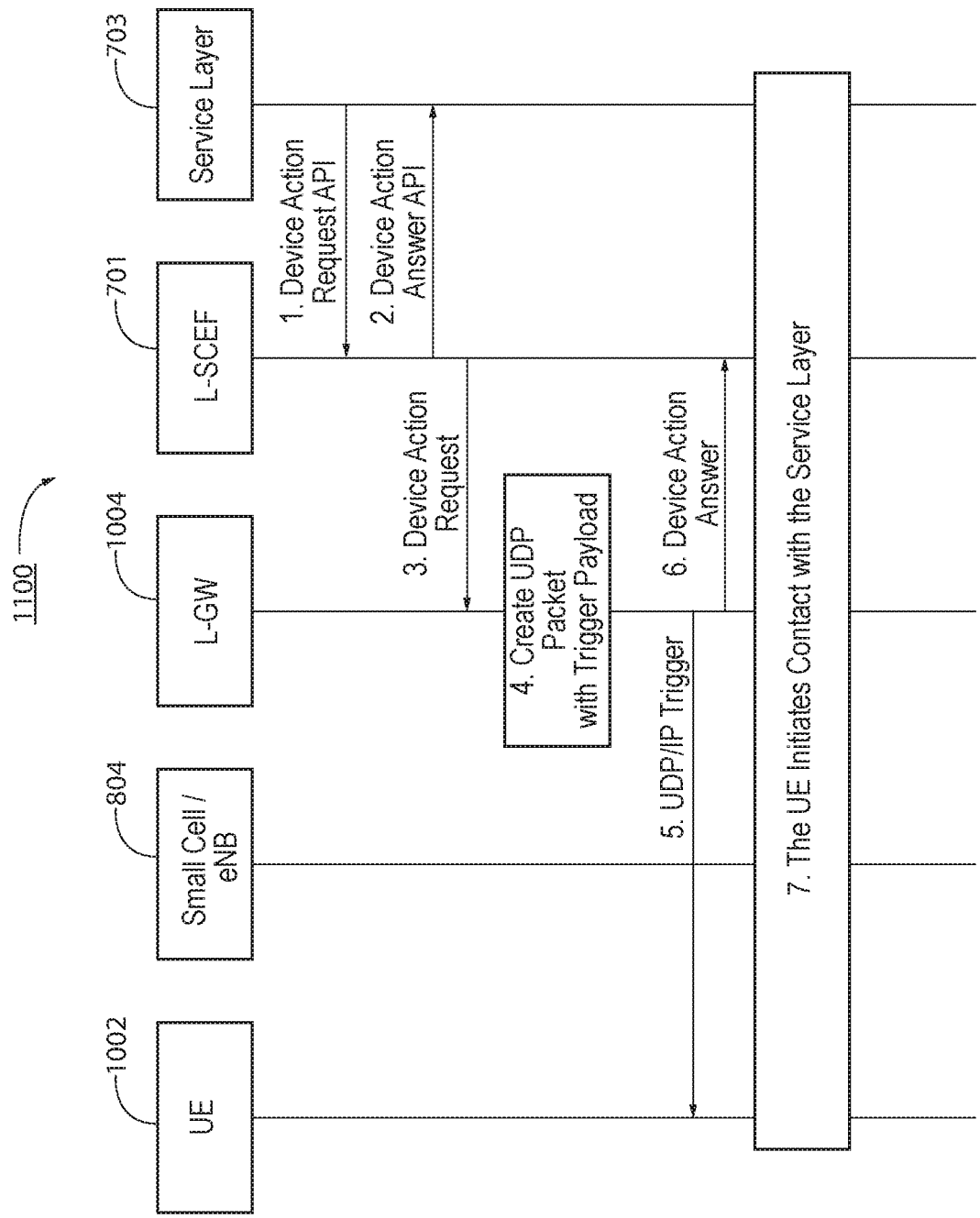
FIG. 11 is a call that shows an example of IP Based Trigger Delivery with the L-SCEF in accordance with an example embodiment.

Referring now to FIG. 11, an example network 1100 includes the example UE 1002, the example small cell/eNB 804, the example L-GW 1004, the example L-SCEF 701, and the example service layer 703. It will be appreciated that the example network 1100 is simplified to facilitate description of the disclosed subject matter and is not intended to limit the scope of this disclosure. Other devices, systems, and configurations may be used to implement the embodiments disclosed herein in addition to, or instead of, a network such as the network 1100, and all such embodiments are contemplated as within the scope of the present disclosure. As shown in FIG. 11, the L-SCEF 701 may pass the trigger request to the L-GW 1004, and the L-GW 1004 may deliver the Trigger to the UE 1002 via the UE's LIPA PDN connection in a User Datagram Protocol (UDP)/Internet Protocol (IP) (UDP/IP) packet.

Still referring to FIG. 10, at 1, in accordance with the illustrated example, the Service Layer 703 uses the L-SCEF Device Action Request API to request a trigger. This step is described above in detail with reference to FIG. 10. The trigger type field may indicate that the trigger should be delivered via UDP/IP. At 2, as shown, the L-SCEF 701 replies to the Trigger Request with an indication of whether or not the request is authorized by the L-SCEF 701 and whether the trigger will be attempted. At 3, the L-SCEF 701 forwards the Trigger Request to the L-GW 1004. In some cases, if the Device ID that was provided at 1 was an Alpha Number Value, then the L-SCEF 701 may convert the Device ID to an IMSI, MSISDN, or an External Identifier. Alternatively, in other cases, if the Device ID that was provided at 1 was an External Identifier, then the L-SCEF 701 may convert the Device ID to an IMSI or MSISDN. At 4, in accordance with the illustrated example, the L-GW 1004 wraps the Trigger Payload in a UDP packet. In some cases, if the L-GW 1004 does not recognize the Device ID or determines that the trigger is not authorized, the process proceed to step 6. At 5, the L-GW 1004 delivers the UDP packet to the UE 1002, and addresses the packet to the Port Number that was indicated in the Application Identifier field. At 6, the L-GW 1004 replies to the L-SCEF 701 with an indication of whether or not the UDP/IP packet was sent. If the L-GW 1004 determines that it does not recognize the Device ID or that the trigger is not authorized, for example, the L-GW 1004 may indicate a rejection cause to the L-SCEF 701 (at 6). At 7, as shown, the UE 1002 establishes contact with the Service Layer 703 in the Local Network. The UE 1002 may obtain the Service Layer's IP Address and Port Number from the Trigger Request, or the UE 1002 may obtain an FQDN from the trigger request and map it to an IP Address and Port Number. It will be understood that "Establishing Contact" with the Service Layer 703 may mean that an Application or Service Layer on the UE 1002 registers with the Service Layer 703 in the local network.

Figure 12:
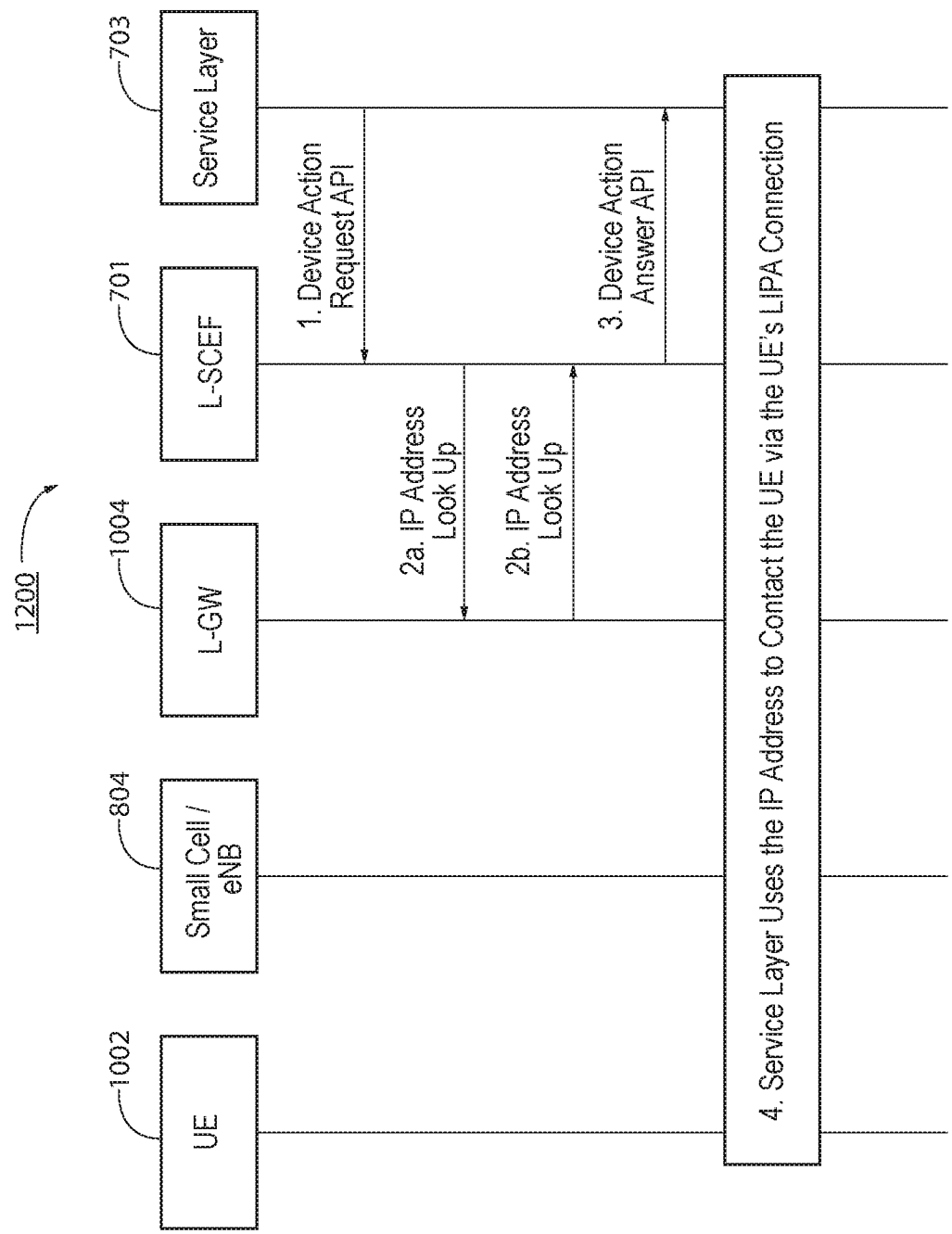
FIG. 12 is a call flow that shows an example of IP Address Lookup with the L-SCEF in accordance with an example embodiment.

Referring now to FIG. 12, as an alternative to sending a trigger to the UE, the L-SCEF may query the L-GW for the UE's IP address, in accordance with another example embodiment. After querying the L-GW for the UE's IP address, the L-SCEF may provide the IP address to the service layer so that the service layer can initiate contact with the UE over the user plane. As shown in FIG. 12, an example network 1200 includes the example UE 1002, the example small cell/eNB 804, the example L-GW 1004, the example L-SCEF 701, and the example service layer 703. It will be appreciated that the example network 1200 is simplified to facilitate description of the disclosed subject matter and is not intended to limit the scope of this disclosure. Other devices, systems, and configurations may be used to implement the embodiments disclosed herein in addition to, or instead of, a network such as the network 1200, and all such embodiments are contemplated as within the scope of the present disclosure.

Still referring to FIG. 12, at 1, in accordance with the illustrated example, the Service Layer 703 uses the L-SCEF Device Action Request API to request a trigger. The request is described in detail with reference to FIG. 10. The action type field in the message at 1 may indicate that the request is an IP Address Look Up request. At 2*a*, the L-SCEF 701 may query the L-GW 1004 for the IP Address of the device (e.g., UE 1002) that was indicated by the Service Layer 703 in the message at 1. For example, the query may be based on the Device's external identifier, MSISDN, or IMSI. If the device ID is an FQDN, then the lookup at 2*a* may be a DNS lookup. At 2*b*, the L-GW 1004 returns the look up result (e.g., IP address of the UE 1002) to the L-SCEF 701. At 3, the L-SCEF 701 replies to the Trigger Request with the IP Address of the UE 1002. At 4, the Service Layer 703 may then establish contact with the UE 1002. It will be understood that "Establishing Contact" with the Service Layer 703 may mean that the Service Layer 702 sends a request, or indication, to the Application or Service Layer on the UE 703 indicating that it should register with the Service Layer 703 in the local network.

Thus, as described above, an apparatus or node can include a processor, a memory, and communication circuitry. The apparatus may be connected to a local network via its communication circuitry, and the apparatus may further include computer-executable instructions stored in the memory of the apparatus which, when executed by the processor of the apparatus, cause the apparatus to receive a request. The request can be a trigger request to trigger a UE. Such a trigger request may indicate an access point name associated with the local network, such that the UE establishes a local IP access connection with the local network. The node may forward the trigger request to a core network function or the mobility management entity for delivery to the UE. The node may format the trigger request for the core network function or the mobility management entity as an NAS PDU or an SMS over NAS PDU. Alternatively, or additionally, the request may indicate that a node be notified when a UE connects to the local network. As described above, the node, for example and without limitation, may be a at least one of a core network function, a Local Service Capability Function (L-SCEF), a Service Layer, an M2M Server, a Gateway, a Server, or a Local Gateway. The UE may be capable of connecting to the local network via a local network anchor. Thus, the apparatus may send a notification when the UE attaches to the local network. Further, the apparatus may send a notification when the UE disconnects from the local network. As described above, the apparatus may be authorized to send the notification by a mobility management entity or core network function. The authorization and information related thereto may be received in an Initial Context Setup/Attach Accept message, a Tracking Area Update Accept Message, or a Path Switch Request Acknowledge message. Subscription information associated with the UE may indicate to the mobility management entity or the core network function that the apparatus is authorized to send the notification. In another embodiment, the apparatus may be authorized to send the notification by an administrator associated with the local network. The apparatus, for example and without limitation, may comprise a core network function, a small cell, base station, eNodeB, NodeB, Home eNodeB, or Home NodeB.

Turning now to example graphical user interfaces (GUIs), a Small Cell of the Small Cell Network may have a configuration GUI that allows a network administrator to configure the Small Cells with various information, such as, for example and without limitation, contact information for the L-SCEF 701, contact information for the L-GW 1004, and which Service Layers are permitted to access the L-SCEF 701. FIG. 13 depicts an example of such a GUI according to one example embodiment. Field 1300 represents the title of the GUI. Actuators 1302, which can be buttons, can be pressed on a touch screed, clicked on using a mouse pointer, or otherwise actuated. For example, actuator 1302*a* can be selected by a user so that the L-SCEF 701 can be configured. Actuator 1302*b* can be selected by a user so that the L-GW 1004 can be configured. Actuator 1302*c* can be selected by a user so that service layers (e.g., Service Layer 703) can be configured.

Figure 16:
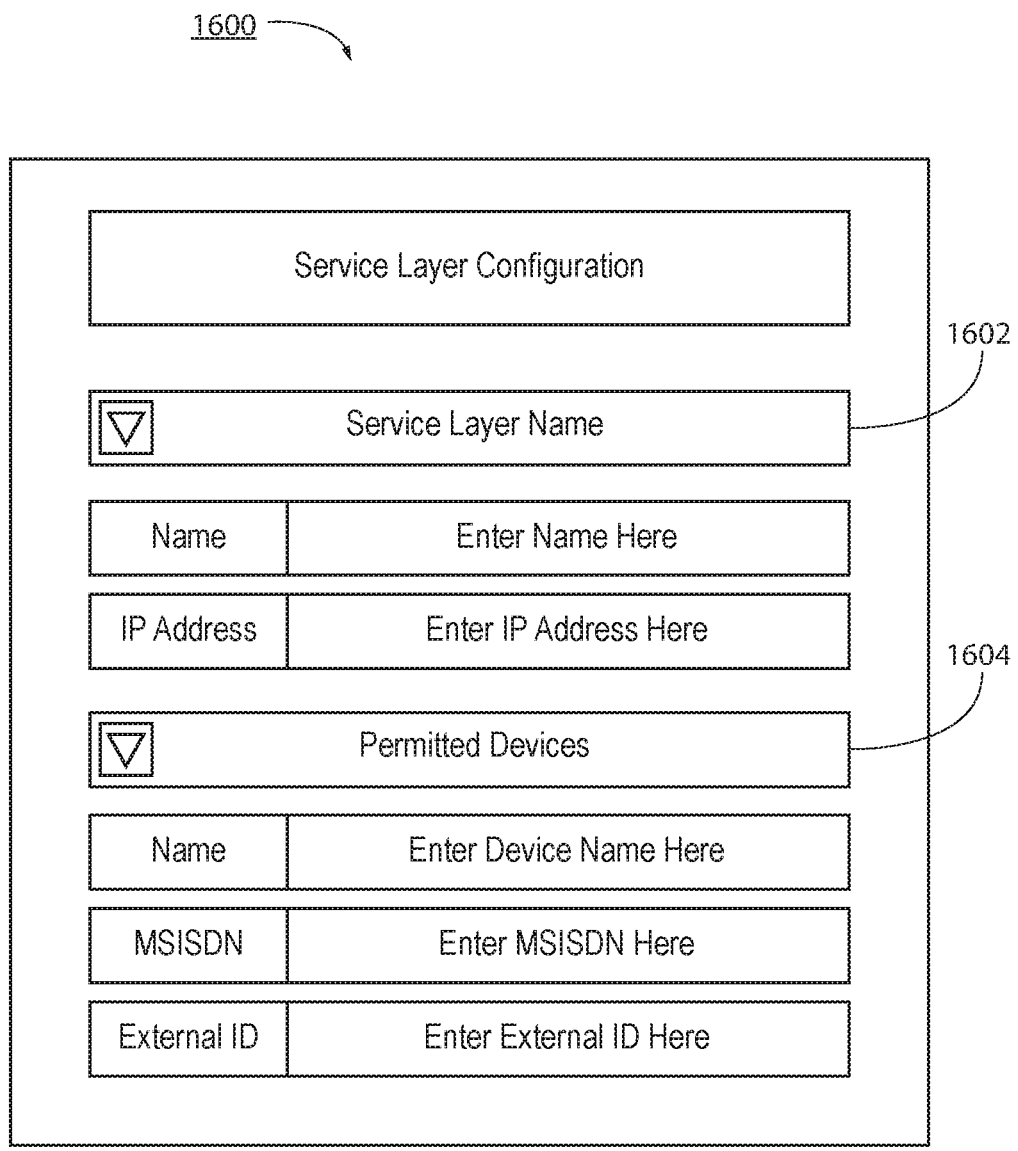
FIG. 16 is another view of the example small network local access configuration GUI.

In an example, when the actuator 1302*a* (L-SCEF Configuration) is selected, a GUI 1400 may be displayed (see FIG. 14). The GUI 1400 may allow a user (e.g., the administrator) to configure the Small Cell Network with the IP Address of the L-SCEF 701. Further, the Service Layers that are allowed to connect to the L-SCEF 701 can be configured using GUI 1400. The example GUI 1400 includes a drop down menu 1402 (Permitted Service Layers drop down menu) that can be used to select which service layers are allowed to connect to the L-SCEF 701. In an example, when the actuator 1302*b* (L-GW Configuration) is selected, an example GUI 1500 may be displayed (see FIG. 15). The GUI 1500 may allow the user to configure the Small Cell Network with the IP Address of the L-GW's L-SCEF interface. The GUI 1500 includes drop down menus 1502 and 1504 to allow the user to select whether the IP Address lookup feature described above and the IP Based Trigger Delivery feature described above should be enabled, respectively. By way of further example, when the actuator 1302*c* (Service Layers Configuration) is selected, a GUI 1600 may be displayed (see FIG. 16). The GUI 1600 may allow the administrator to configure the small cell network with information about the Service Layers in the small cell network. A drop down menu 1602 may be selected by a user who wishes to configure a new service layer or modify an existing configuration. A service layer name and IP address may be entered for each service layer using the drop down menu 1602. A drop down menu 1604 may be selected by a user who wishes to associate an existing device with the Service Layer, or by a user who wishes to enter information for a new device that will be associated with the service layer. A device name, MSISDN, and external identifier may be entered using the drop down menu 1604. It will be understood that the GUIs are presented by way of example, and the GUIs may be constructed as desired, such that configuration parameters can be viewed and altered as desired. It will be understood that the example user interfaces can be used to monitor and control alternative parameters as desired. It will further be understood that GUIs can provide a user with various information in which the user is interested via a variety of charts or alternative visual depictions.

Turning now to oneM2M deployments of the above-described features, the Service Layer(s) and applications that interface to the L-SCEF may be oneM2M MN-CSE(s) and/or IN-CSE(s) or AE(s). The oneM2M Mcn reference point may be implemented via the L-SCEF API, or the Mcn interface may map to the interface between the L-SCEF and L-GW, and between the L-SCEF and eNB. The UE Application or Service Layer that receives a trigger may be a oneM2M AE or ASN-CSE, respectively. In an example embodiment, the L-SCEF API may be bound to a REST based protocol, such as HTTP for example. Alternatively, it may be bound to a protocol such as SOAP or LDAP, for example.

Figure 17:
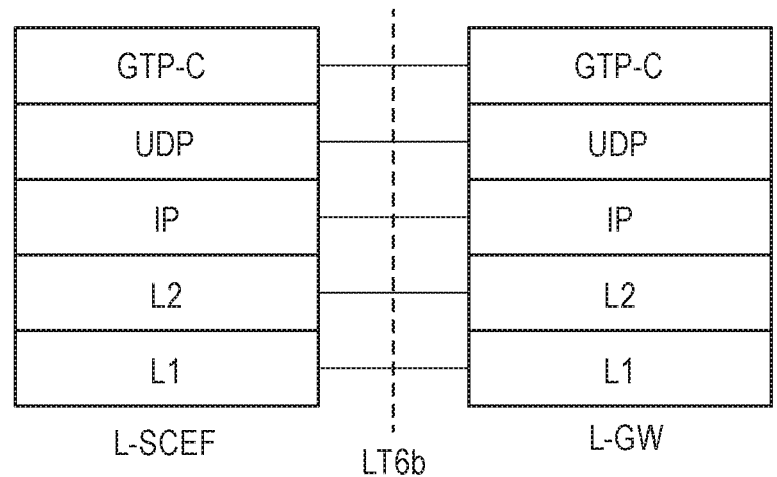
FIG. 17 shows an example LT6b protocol stack in accordance with an example embodiment.

In another example, the L-GW and L-SCEF may be integrated with each other, and the LT6b interface between the two functions may be implemented via function calls. Alternatively, or additionally, for example, the Interface between the L-SCEF and L-GW may be based on the Diameter Protocol, SOAP, LDAP, GTP-C, bound to a REST based protocol such as HTTP, or implemented as an application protocol that runs on top of SCTP. By way of example, FIG. 17 shows an example in which the LT6b protocol is based on GTP-C.

Figure 18:
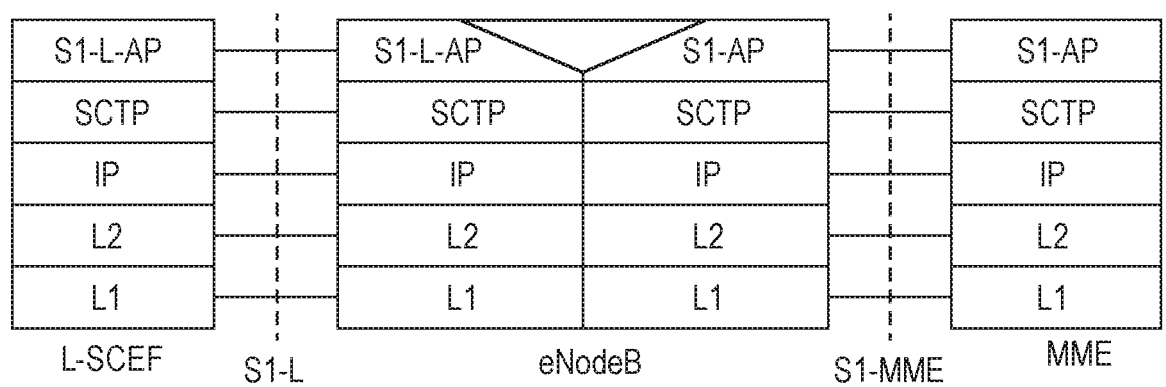
FIG. 18 shows an example S1-L protocol stack in accordance with an example embodiment.

In another example embodiment, the Small Cell and L-SCEF may be integrated with each other and the S1-L interface between the two functions may be implemented via function calls. Alternatively, or additionally, the Interface between the L-SCEF and L-GW may be based on the Diameter Protocol, SOAP, LDAP, bound to a REST based protocol such as HTTP, or implemented as an application protocol that runs on top of SCTP. In some cases, if the interface is implemented as an application protocol that runs on top of SCTP, the interface may be a modified version of the 3GPP NAS or S1-AP protocols. FIG. 18 shows a diagram of the S1-L protocol stack for the example case where the S1-L interface is based on an application that runs on top of SCTP. FIG. 18 also depicts an example of how the eNodeB may relay information between the SCEF and MME.

Figure 19A:
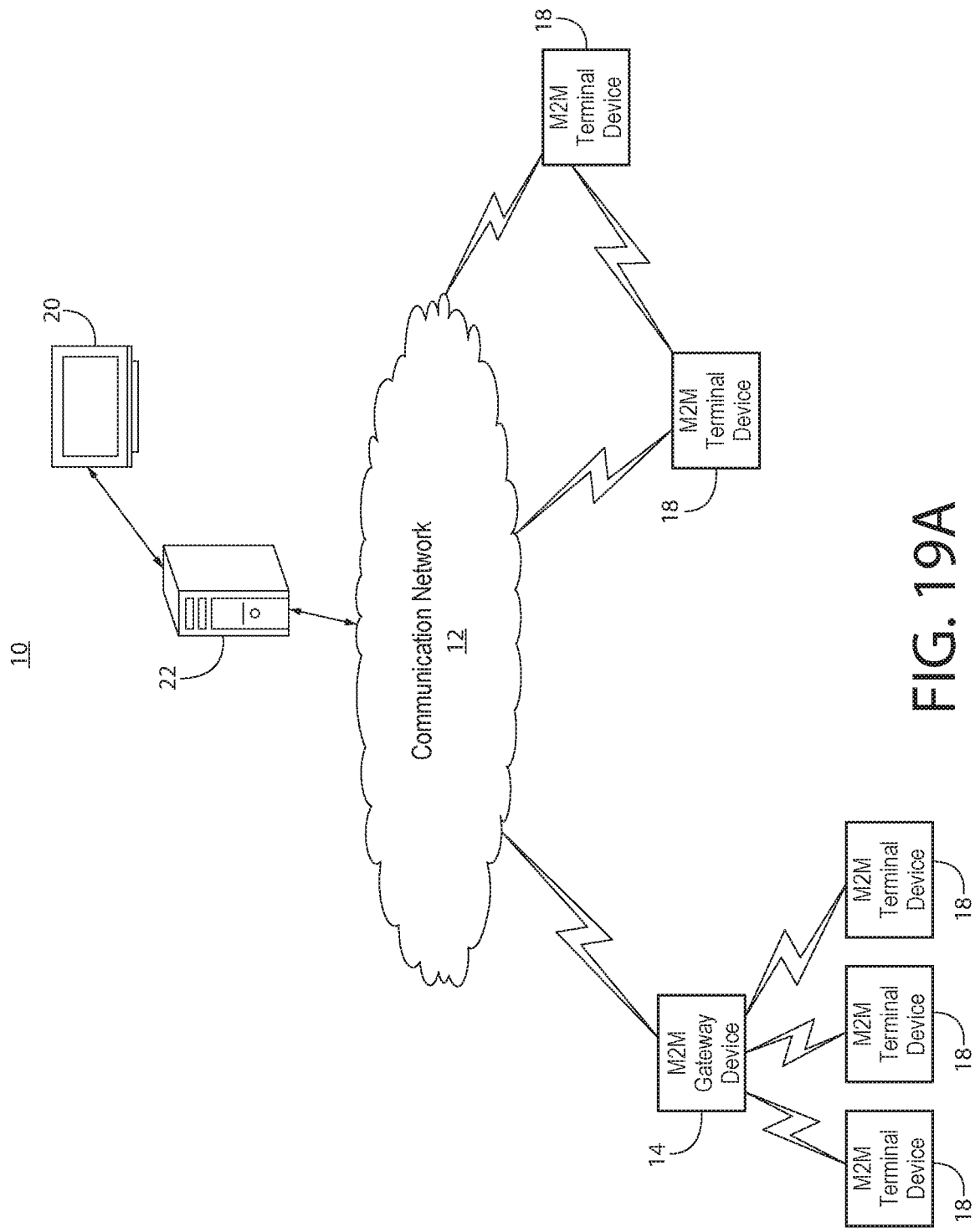
FIG. 19A is a system diagram of an example machine-to-machine (M2M) or Internet of Things (IoT) communication system in which one or more disclosed embodiments may be implemented.

FIG. 19A is a diagram of an example machine-to-machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway or M2M service platform may be a component of the IoT/WoT as well as an IoT/WoT service layer, etc. Any of the devices, functions, nodes, or networks illustrated in any of FIGS. 8-12 may comprise a node of a communication system such as the one illustrated in FIGS. 19A-D.

As shown in FIG. 19A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 19A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different nodes (e.g., servers, gateways, devices, of the network. For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. A M2M gateway device 14 allows wireless M2M devices (e.g. cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example. Exemplary M2M devices include, but are not limited to, tablets, smart phones, medical devices, temperature and weather monitors, connected cars, smart meters, game consoles personal digital assistants, health and fitness monitors, lights, thermostats, appliances, garage doors and other actuator-based devices, security devices, and smart outlets.

Figure 19B:
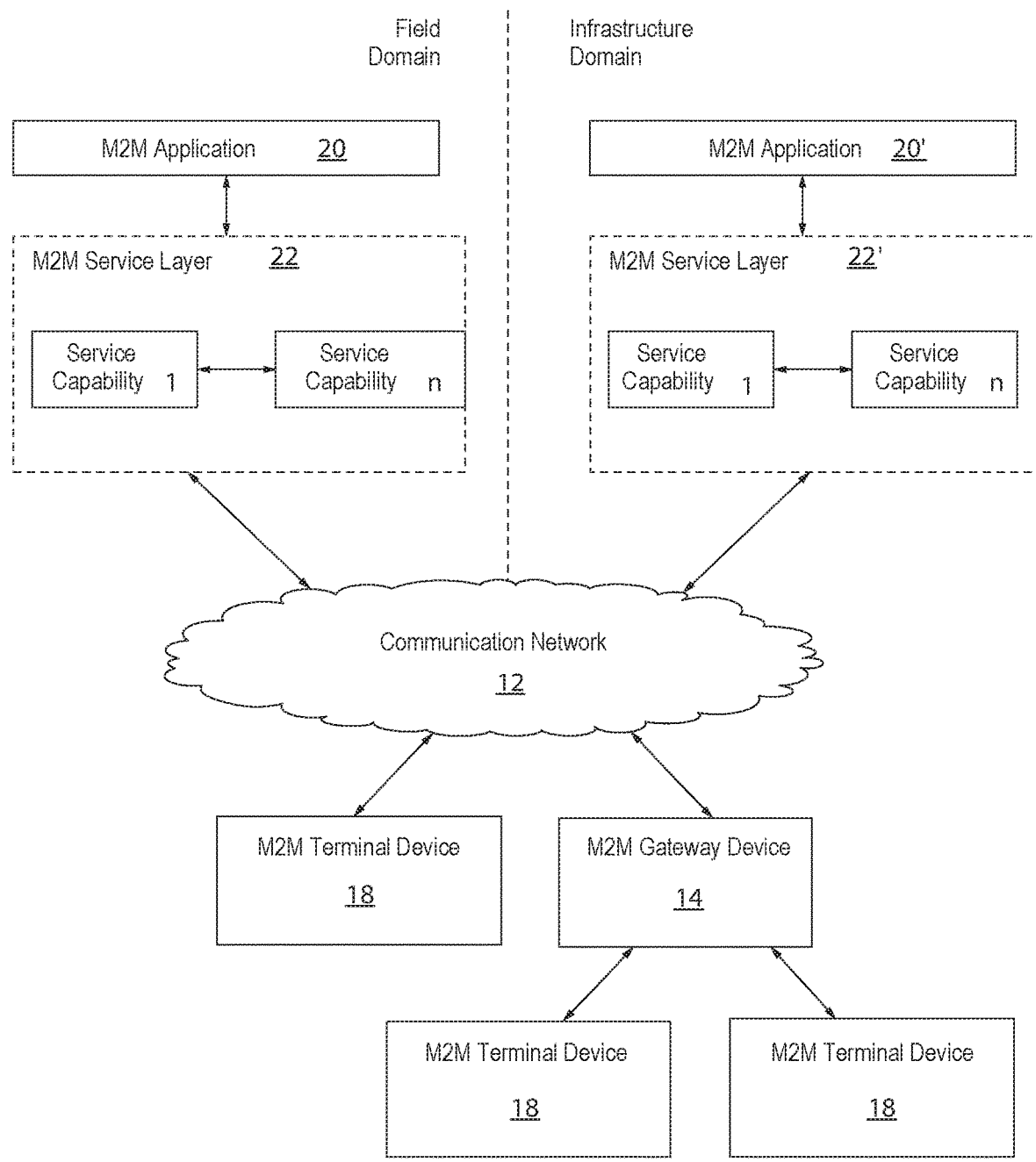
FIG. 19B is a system diagram of an example architecture that may be used within the M2M/IoT communications system illustrated in FIG. 19A.

Referring to FIG. 19B, the illustrated M2M service layer 22 in the field domain provides services for the M2M application 20, M2M gateway devices 14, and M2M terminal devices 18 and the communication network 12. It will be understood that the M2M service layer 22 may communicate with any number of M2M applications, M2M gateway devices 14, M2M terminal devices 18, and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g., cloud/compute/storage farms, etc.) or the like.

Still referring to FIG. 19B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery, etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

Generally, a service layer (SL), such as the service layers 22 and 22' illustrated in FIGS. 19A and 19B, defines a software middleware layer that supports value-added service capabilities through a set of application programming interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE), which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented in a logical entity (e.g., software, computer-executable instructions, and the like) executing either on one or more standalone nodes in the network, including servers, computers, and other computing devices or nodes, or as part of one or more existing nodes. As an example, an instance of a service layer or component thereof may be implemented in the form of software running on a network node (e.g., server, computer, gateway, device, or the like) having the general architecture illustrated in FIG. 19C or 19D described below.

Further, the methods and functionalities described herein may be implemented as part of an M2M network that uses a Service Oriented Architecture (SOA) and/or a resource-oriented architecture (ROA) to access services, such as the above-described Network and Application Management Service for example.

Figure 19C:
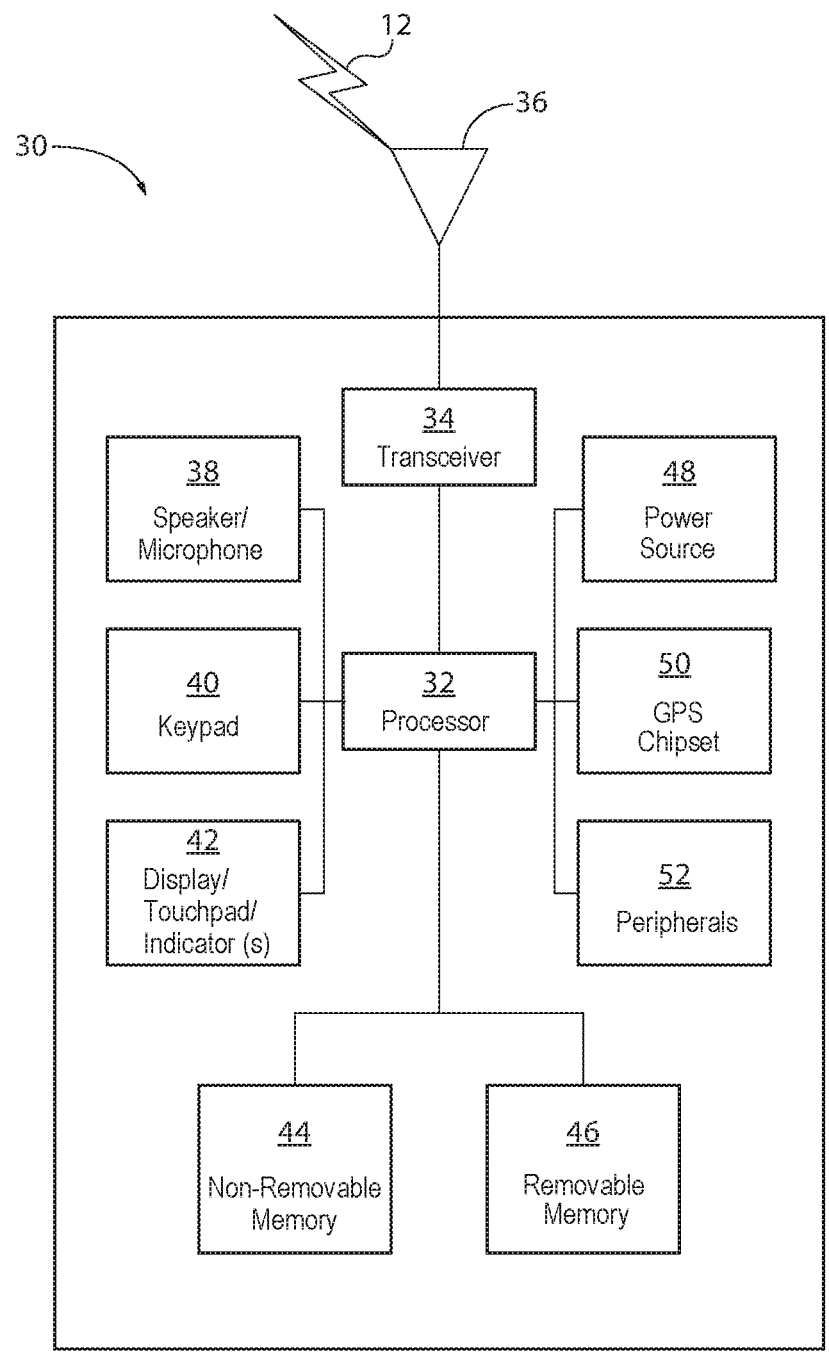
FIG. 19C is a system diagram of an example M2M/IoT terminal or gateway device that may be used within the communications system illustrated in FIG. 19A.

FIG. 19C is a block diagram of an example hardware/software architecture of a node of a network, such as one of the nodes, devices, functions, or networks illustrated in FIGS. 8-12 which may operate as an M2M server, gateway, device, or other node in an M2M network such as that illustrated in FIGS. 19A and 19B. As shown in FIG. 19C, the node 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. The node 30 may also include communication circuitry, such as a transceiver 34 and a transmit/receive element 36. It will be appreciated that the node 30 may include any sub-combination of the foregoing elements while remaining consistent with an embodiment. This node may be a node that implements the notifications and triggers related thereto described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the node 30 to operate in a wireless environment. The processor 32 may be coupled to the transceiver 34, which may be coupled to the transmit/receive element 36. While FIG. 19C depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

As shown in FIG. 19C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein (e.g., in FIGS. 8-12) and in the claims. While FIG. 19C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other nodes, including M2M servers, gateways, devices, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 19C as a single element, the node 30 may include any number of transmit/receive elements 36. More specifically, the node 30 may employ MIMO technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer. The processor 32 may be configured to control lighting patterns, images, or colors on the display or indicators 42 to reflect the status of a node or configure a node a UE (e.g., FIGS. 13-16), and in particular underlying networks, applications, or other services in communication with the UE. The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. It will be appreciated that the node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 19D:
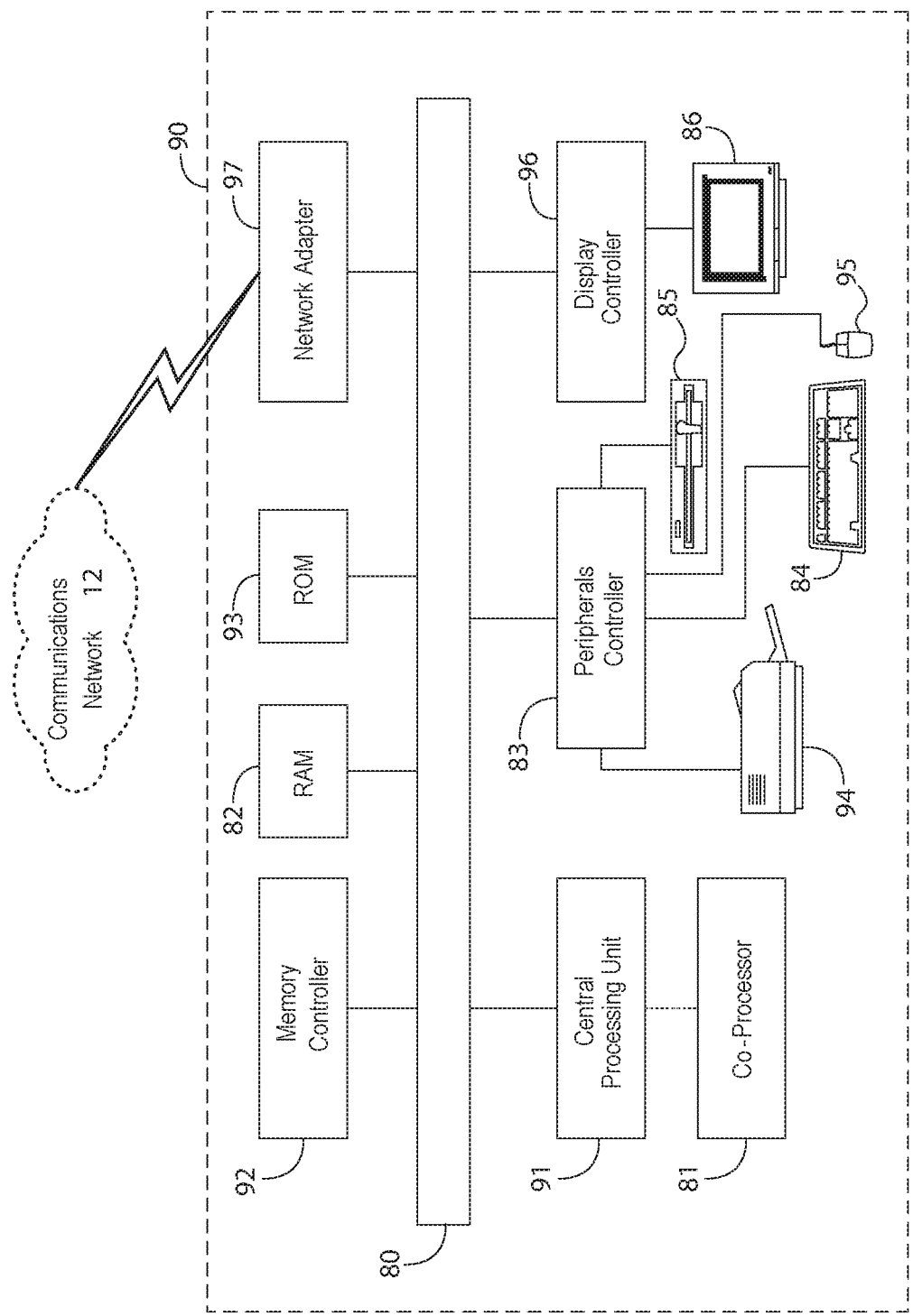
FIG. 19D is a block diagram of an example computing system in which aspects of the communication system of FIG. 19A may be embodied.

FIG. 19D is a block diagram of an exemplary computing system 90 which may also be used to implement one or more nodes of a network, such as nodes, devices, functions, or networks illustrated in FIGS. 8-12, which may operate as an M2M server, gateway, device, or other node in an M2M network such as that illustrated in FIGS. 19A and 19B. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, which performs additional functions or assists CPU 91. CPU 91 and/or coprocessor 81 may receive, generate, and process data related to the disclosed systems and methods for security protection.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97 that may be used to connect computing system 90 to an external communications network, such as network 12 of FIG. 19A and FIG. 19B, to enable the computing system 90 to communicate with other nodes of the network. The communication circuitry, alone or in combination with the CPU 91, may be used to perform the transmitting and receiving steps described herein (e.g., in FIGS. 8-12) and in the claims.

Figure 20:
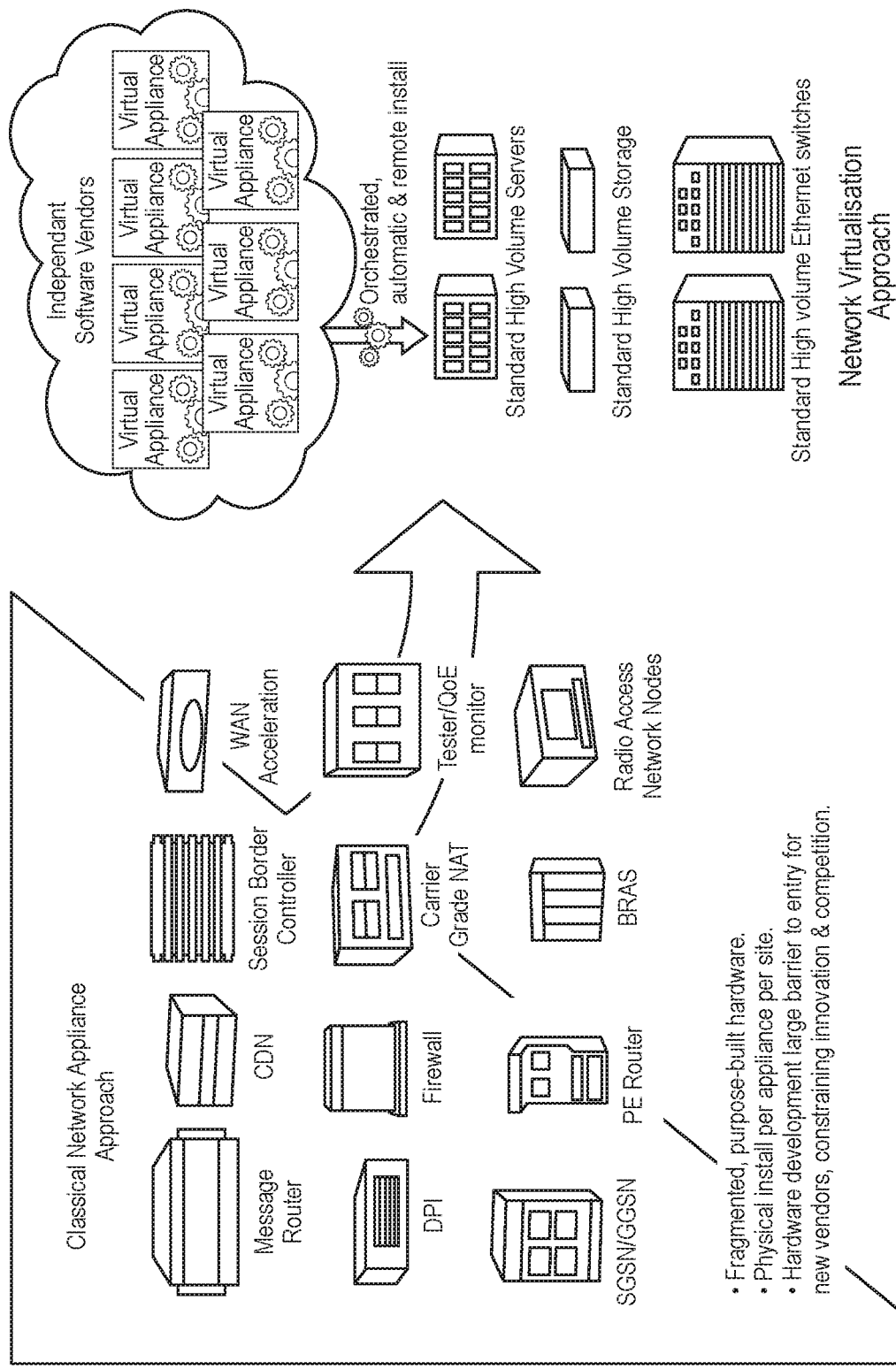
FIG. 20 is a diagram that illustrates an example architecture framework for Network Functions Virtualization (NFV), in which one or more disclosed embodiments may be implemented.

Referring now to FIG. 20, as mentioned above, further details related to Network Functions Virtualization (NFV) is provided, as embodiments described herein may be implemented by NFV. By way of background, NFV aims to transform the way that network operators architect networks. In particular, IT virtualization technology is being used to consolidate many network equipment types onto industry standard high volume servers, switches and storage, which can be located in data centers, network nodes, and in the end user premises. Network functions (e.g., mobility management, session management, QoS) can be implemented in software, and the network functions can run on a range of industry standard server hardware. The functions can be moved to, or instantiated in, various locations in the network as required, without the need for installation of new equipment. FIG. 20 illustrates one example of an architectural framework for NFV that has been provided by ETSI.

It is recognized herein that NFV may be applied to any data plane packet processing and control plane function in mobile and fixed networks. Examples include, presented without limitation:

Switching elements (e.g., BNG, CG-NAT, routers)
Mobile network nodes (e.g., HLR/HSS, MME, SGSN, GGSN/PDN-GW, RNC, eNodeB)
Functions contained in home routers and set top boxes to create virtualized home environments
Converged and network-wide functions (e.g., AAA servers, policy control, and charging platforms
Application-level optimization (e.g., CDNs, Cache Servers, Load Balancers, Application Accelerators)
Security functions (e.g., firewalls, virus scanners, intrusion detection systems, spam protection It is recognized herein that applying NFV may provide various benefits to network operators, which may contribute to dramatic changes in the telecommunications industry landscape. For example, and without limitation, it is recognized herein that NFV may provide for:

Reduced equipment costs and reduced power consumption through consolidating equipment and exploiting the economies of scale of the IT industry.
Increased velocity of Time to Market by minimizing the typical network operator cycle of innovation.
The possibility of running production, test and reference facilities on the same infrastructure provides more efficient testing and integration, reducing development costs and time to market.
Targeted service introduction based on geography or customer sets. Services can be rapidly scaled up/down as required.
The enablement of a wide variety of eco-systems (encouraging openness).
Optimized network configuration and/or topology in near real time based on the actual traffic/mobility patterns and service demand.
The support of multi-tenancy, thereby allowing network operators to provide tailored services and connectivity for multiple users, applications, internal systems, or other network operators, which may co-existing on the same hardware with appropriate secure separation of administrative domains.
Reduced energy consumption by exploiting power management features in standard servers and storage, as well as workload consolidation and location optimization.

The European Telecommunications Standards Institute (ETSI) has formed a specification group ("Network Functions Virtualization") to publish white papers, and to produce several more in-depth materials, including standard terminology definitions and use cases for NFV that act as references for vendors and operators who are considering implementing NFV.

Figure 21:
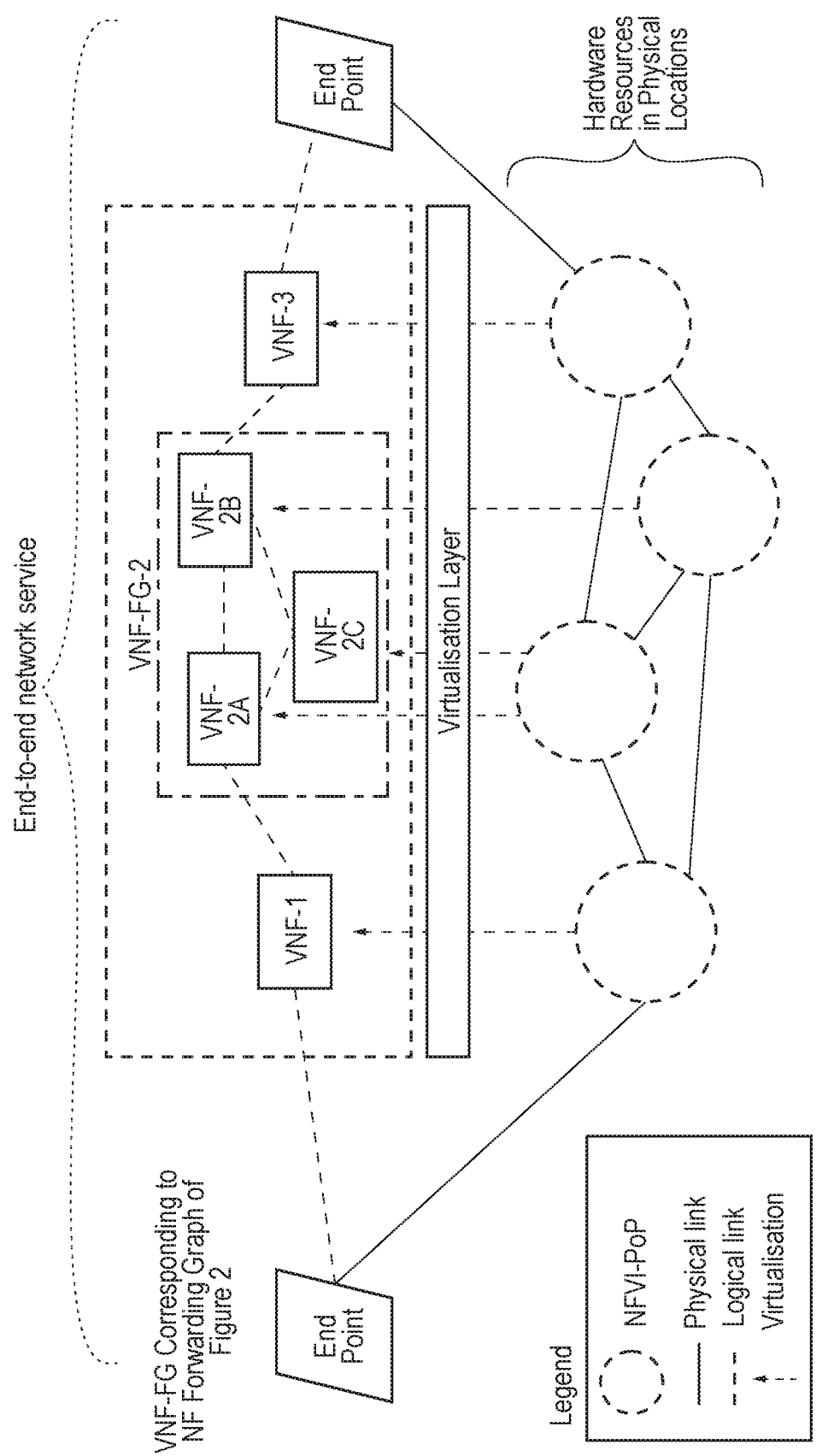
FIG. 21 is a diagram that illustrates an example of a Virtualized Network Function Forwarding Graph (VNF-FG)

FIG. 21 is an example (from ETSI GS NFV 002) of an end-to-end Network Service with VNFs and nested forwarding graphs. FIG. 21 illustrates the concept of a Virtualized Network Function Forwarding Graph (VNF-FG). A VNF-GW describes how a set of VNF's are connected to provide a service.

Figure 22:
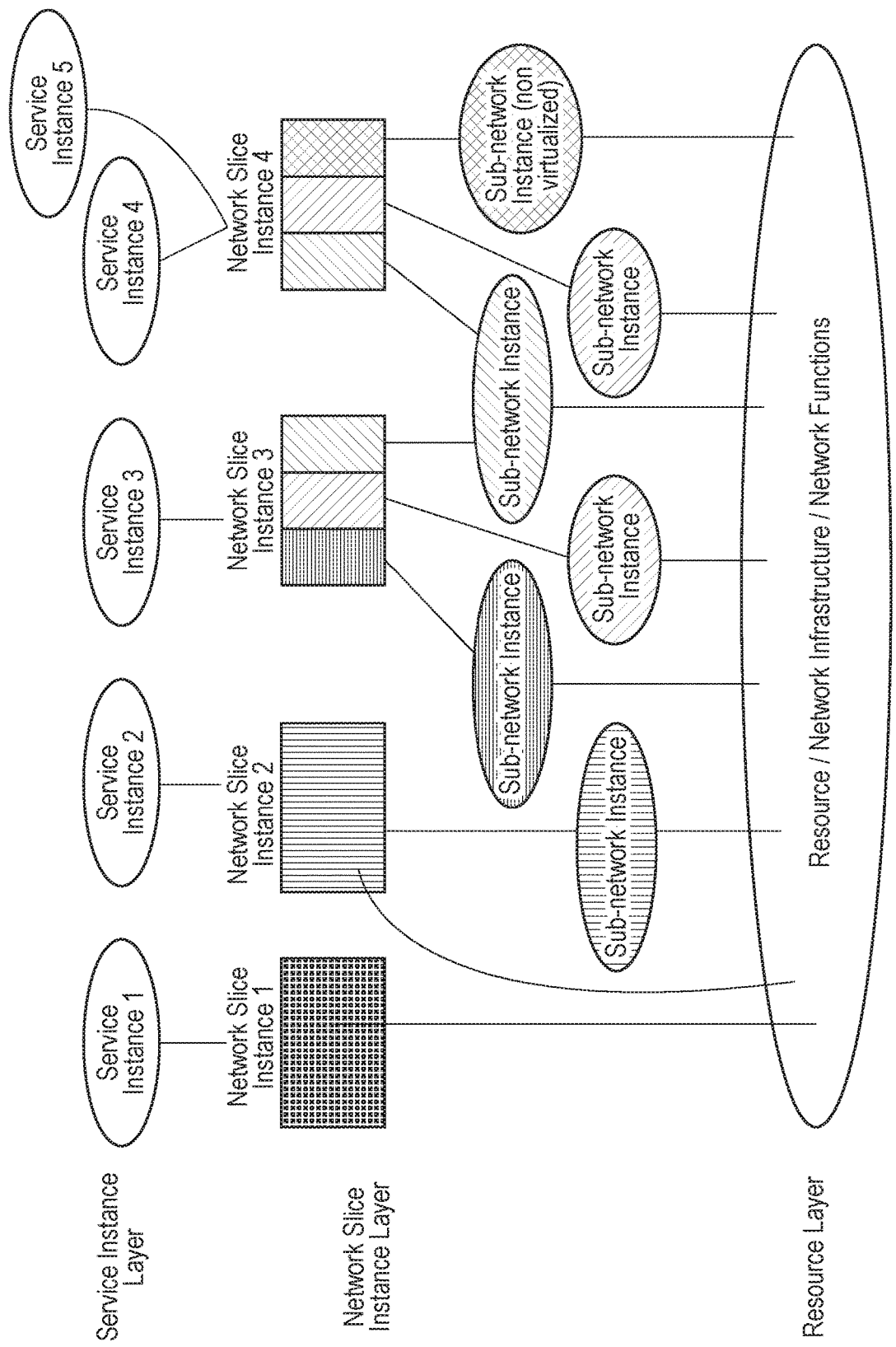
FIG. 22 is a diagram that illustrates an example architecture for network slicing, in which one or more disclosed embodiments may be implemented.

Network Slicing, such as described in the Next Generation Mobile Network (NGMN) Alliance, "Description of Network Slicing Concept", is a mechanism that can be used by mobile network operators to support multiple virtual networks behind the air interface across the fixed part of the mobile operator's network (both backhaul and core network). This involves 'slicing' the network into multiple virtual networks to support different RANs or different service types running across a single RAN. Network slicing enables the operator to create networks that are customized to provide optimized solutions for different market scenarios that demand diverse requirements, for example, in the areas of functionality, performance, and isolation. FIG. 22 shows an example conceptual architecture of network slicing. It will be understood that the different types of shading in FIG. 22 indicate the different network slice instances or subnetwork slice instances.

3GPP is designing a 5G network and is considering whether to incorporate the network slicing technology, which may be a good fit for the 5G network because the 5G use cases (e.g., massive IoT, critical communications, and enhanced mobile broadband) demand very diverse and sometimes extreme requirements. The current architecture utilizes a relatively monolithic network and transport framework to accommodate a variety of services, such as, for example, mobile traffic from smart phones, OTT content, feature phones, data cards, and embedded M2M devices. It is anticipated that the current architecture is not flexible and scalable enough to efficiently support a wider range of business need when each has its own specific set of performance, scalability, and availability requirements. Furthermore, it is recognized herein that the introduction of new network services should be made more efficient. Nevertheless, several use cases are anticipated to be active concurrently in the same operator network, thus requiring a high degree of flexibility and scalability of the 5G network.

Figure 23:
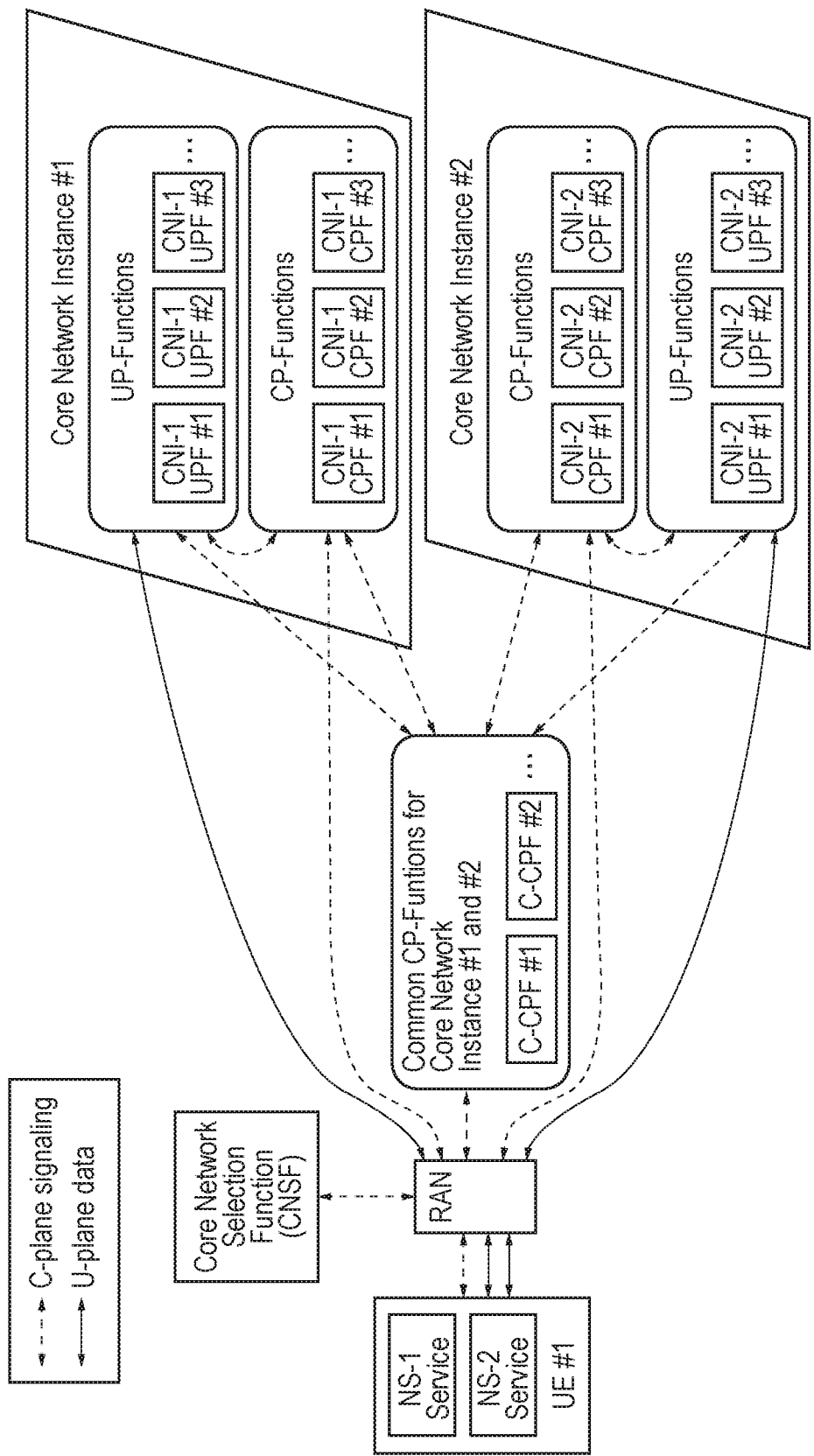
FIG. 23 is a diagram that illustrates an example Core Network Selection Function (CNSF) for selecting multiple network slice instances.

In some cases, to enable a UE to simultaneously obtain services from multiple Network Slices of one network operator, a single set of Control Plane Functions is shared across multiple Core Network Instances, as shown in FIG. 23.

A Core Network Instance consists of a single set of Control Plane Functions and a single set of User Plane Functions. Moreover, a Core Network Instance is dedicated for the UEs that are belonging to the same UE type. Identifying the UE type is done by using a specific parameter, e.g., the UE Usage Type, and/or an information from the UE's subscription. A set of User Plane Functions in a Core Network Instance is responsible for providing a specific service to the UE and for transports the User Plane data of the specific service. For example, one set of User Plane functions in Core Network Instance #1 provides an enhanced mobile broadband service to the UE, whereas another set of User Plane functions in Core Network Instance #2 provides a critical communication service to the UE. When a UE first connects to the operator's Network, a default Core Network Instance that matches to the UE Usage Type is assigned to the UE. Each UE can have multiple User Plane connections to different sets of User Plane Function that are available at different Core Network Instances simultaneously. Control Plane functions may be shared across network slices.

The Core Network Selection Function (CNSF) may have several responsibilities. For example, the CNSF may select which Core Network Instance accommodates the UE, for example, by taking into account the UE's subscription and a specific parameter (e.g., the UE Usage Type). The CNSF may select which Control Plane Functions within the selected Core Network Instance with which the Base Station should communicate. This selection of Control Plane Functions may be done by using the specific parameter (e.g., UE Usage Type). The CNSF may select which set of User Plane Functions with which the Base Station should establish the connection for transporting User Plane data of different services. This selection of User Plane Function is done by using specific parameters (e.g., UE Usage Type and the Service Type).

Figure 24:
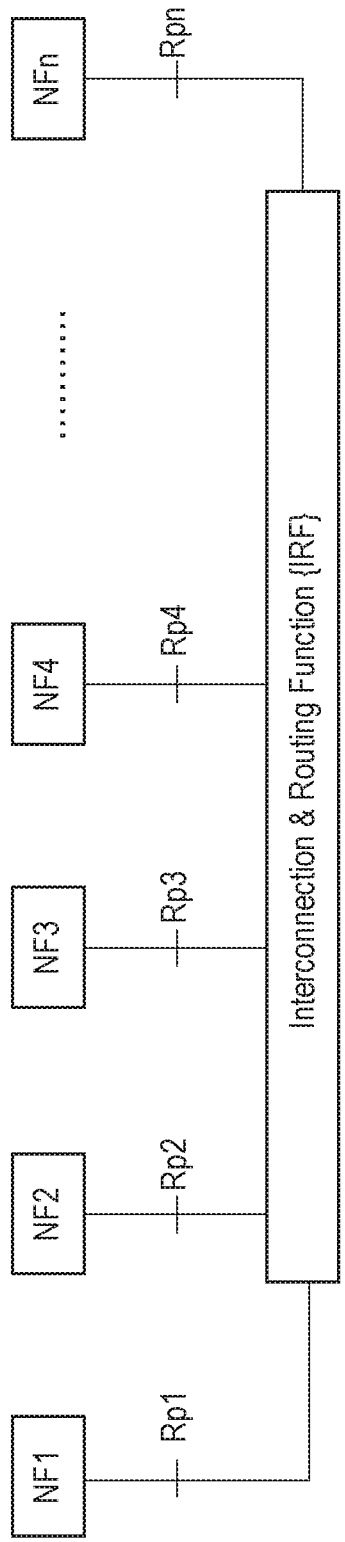
FIG. 24 is a diagram that illustrates an example non-roaming reference model for the interconnection of network functions.
Figure 25:
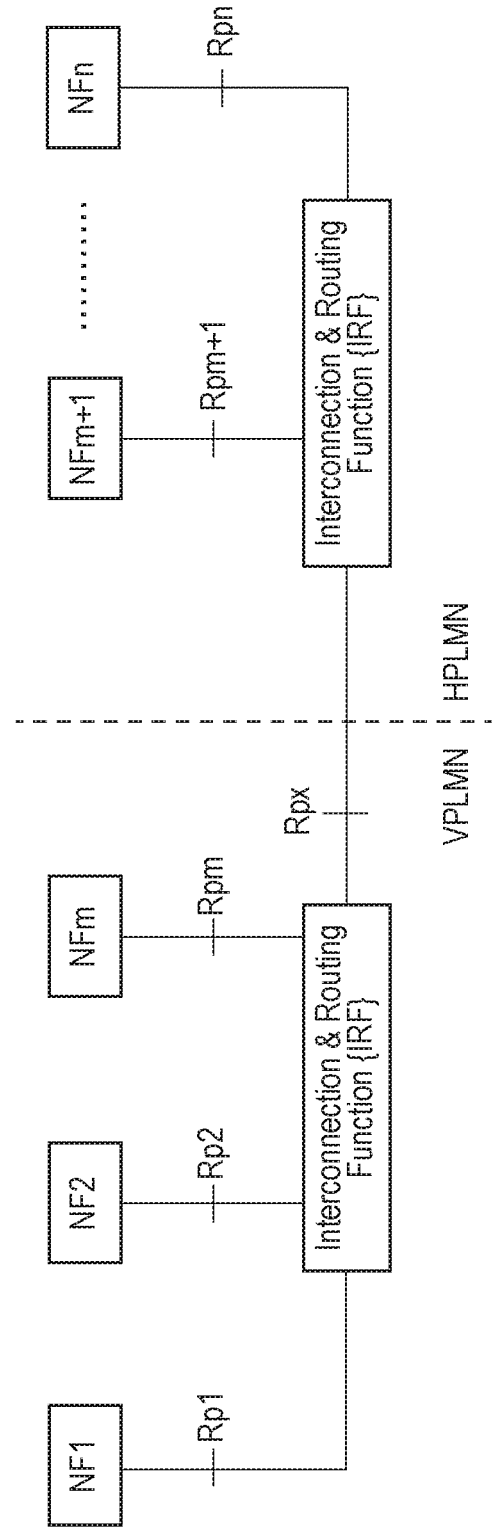
FIG. 25 is a diagram that illustrates a roaming reference model for the interconnection of network functions.

To enable the interconnection of network functions, the Interconnection & Routing Function (IRF) 2058 is proposed in 3GPP TR 23.799, Study on Architecture for Next Generation System. FIG. 24 and FIG. 25 show the reference models of IRF 2058 for non-roaming and roaming scenarios, respectively. The functions of IRF 2058 include, presented by way of example and without limitation:

- Stores the binding between the UE's identity and the interface layer identity (e.g., instance number) of each serving NF, which has an active session for the UE. For the NFs that do not interface with the IRF 2058 directly, e.g. in roaming scenario, the IRF 2058 stores the identity of the remote-PLMN's IRF 2058 via which of those NFs are reachable.
- Updates the binding repository when the identity of the serving NF changes for a given UE (e.g., due to UE mobility, load re-balancing or scale-in or scale-out of virtual machines or restoration reasons).
- Examines the message header to determine the identity of the UE (for which the message is sent) and the destination NF. For the UE's identity, the IRF looks up the internal binding repository to determine the interface layer identity (e.g., instance number) of the destination NF or the identity of the remote IRF 2058, and then routes the message accordingly.
- Optionally performs authorization of the message based on the operator's configuration. For example, if the operator's configuration prohibits NF1 from sending a certain message (e.g., such as "change of UE's APN-AMBR") toward NF4, then the IRF 2058 rejects the corresponding message. In some cases, the IRF optionally protects NFs during a signaling storm by performing overload control (e.g., pacing of messages sent to a given NF based on its load/overload condition).

Each NF interfaces with the IRF 2058 via a given reference point in its own PLMN. In some cases, as shown, the NFs do not interface with each other directly but can communicate (e.g., send request or response messages) with each other via the IRF 2058. Thus, when required, this model allows any NF to communicate with any other NF directly without involving any other unrelated network functions in the path. For example, as shown, the NF1 can send a message to the NF3 via IRF 2058 without involving the NF2 (e.g., if the involvement of NF2 is not needed).

It will be understood that any of the methods and processes described herein may be embodied in the form of computer executable instructions (i.e., program code) stored on a computer-readable storage medium which instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

The following is a list of acronyms relating to service level technologies that may appear in the above description. Unless otherwise specified, the acronyms used herein refer to the corresponding term listed below.

ACS Auto Configuration Server
API Application Protocol Interface
CSE Common Services Entity
CSG Closed Subscriber Group
ECM EPS Connection Management
EMM EPC Mobility Management
EPC Evolved Packet Core
EPS Evolved Packet System
HTTP Hyper Text Transfer Protocol
IMSI International Mobile Subscriber Identity
IN-CSE Infrastructure CSE
LDAP Lightweight Directory Access Protocol
L-GW Local Gateway
L-SCEF Local SCEF
LIPA Local IP Access
MME Mobility Management Entity
MN-CSE Middle Node CSE
NAS Non-Access Stratum
NSE Network Services Entity
PDN Packet Data Network
P-GW PDN Gateway
SCEF Service Capability Exposure Function
SCS Service Capability Server
SOAP Simple Object Access Protocol
SIPTO Selected IP Traffic Offload
S-GW Serving Gateway This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A base station comprising a processor, a memory, and communication circuitry, the base station being connected to a local network via its communication circuitry, the base station further comprising computer-executable instructions stored in the memory of the base station which, when executed by the processor of the base station, cause the base station to perform operations comprising:

receiving a connection notification request, the connection notification request indicating that a node, the node being a node of the local network, be notified when a user equipment (UE) connects to the local network, wherein the connection notification request comprises an identifier of the local network, an application server identifier, the identifier of the local network comprising a local gateway address or a local home network identifier, and wherein the UE is capable of connecting to the local network via a local base station;

the operations further comprising sending a notification when the UE attaches to the local base station and there is a local IP network available to the UE, the notification comprising the application server identifier and an identifier of the UE.

2. The base station as recited in claim 1, the base station further comprising computer-executable instructions which, when executed by the processor of the base station, cause the base station to perform further operations comprising sending a notification when the UE disconnects from the local network.

3. The base station as recited in claim 1, wherein the base station is authorized to send the notification by a core network function.

4. The base station as recited in claim 3, wherein the authorization to send the notification and information related thereto is received in an Initial Context Setup/Attach Accept message, a Tracking Area Update Accept Message, or a Path Switch Request Acknowledge message.

5. The base station as recited in claim 4, wherein subscription information associated with the UE indicates to the core network function that the base station is authorized to send the notification.

6. The base station as recited in claim 1, wherein the base station is authorized to send the notification by an administrator associated with the local network.

7. The base station as recited in claim 1, the base station further comprising computer-executable instructions which, when executed by the processor of the base station, cause the base station to perform further operations comprising:

receiving a trigger request to trigger the UE, the trigger request indicating an access point name associated with the local network, such that the UE establishes a local IP access connection with the local network.

8. The base station as recited in claim 7, the base station further comprising computer-executable instructions which, when executed by the processor of the base station, cause the base station to perform further operations comprising forwarding the trigger request to a core network function for delivery to the UE.

9. The base station as recited in claim 8, the base station further comprising computer-executable instructions which, when executed by the processor of the base station, cause the base station to perform further operations comprising formatting the trigger request for the core network function as an NAS PDU or an SMS over NAS PDU.

10. The base station as recited in claim 1, wherein the base station is a small cell, eNodeB, NodeB, Home eNodeB, or Home NodeB.

11. The base station of claim 1, wherein the computer-executable instructions further cause the base station to receive an authorization to send, to a plurality of nodes within the local network, notifications and information related to the UE.

* * * * *